(12) United States Patent
Maes

(10) Patent No.: US 10,567,231 B2
(45) Date of Patent: Feb. 18, 2020

(54) EXECUTION OF A TOPOLOGY

(71) Applicant: HEWLETT PACKARD ENTERPRISE DEVELOPMENT LP, Houston, TX (US)

(72) Inventor: Stephane Herman Maes, Sunnyvale, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

(21) Appl. No.: 15/028,466

(22) PCT Filed: Oct. 30, 2013

(86) PCT No.: PCT/US2013/067570
§ 371 (c)(1),
(2) Date: Apr. 11, 2016

(87) PCT Pub. No.: WO2015/065389
PCT Pub. Date: May 7, 2015

(65) Prior Publication Data
US 2016/0254961 A1  Sep. 1, 2016

(51) Int. Cl.
*H04L 12/24* (2006.01)
*H04L 12/911* (2013.01)

(52) U.S. Cl.
CPC ............ *H04L 41/12* (2013.01); *H04L 47/829* (2013.01)

(58) Field of Classification Search
CPC ....................................................... H04L 41/12
See application file for complete search history.

(56) References Cited

U.S. PATENT DOCUMENTS

| | | |
|---|---|---|
| 7,512,578 B2 | 3/2009 | Abnous et al. |
| 7,979,245 B1 | 7/2011 | Bourlatchkov et al. |
| 8,032,557 B1 | 10/2011 | Vijendra et al. |
| 8,082,337 B1 | 12/2011 | Davis et al. |
| 8,132,260 B1 | 3/2012 | Mayer et al. |
| 8,175,987 B2 | 5/2012 | Fickie et al. |
| 8,244,777 B1 | 8/2012 | Vijendra et al. |
| 8,250,213 B2 | 8/2012 | Glover et al. |
| 8,266,321 B2 | 9/2012 | Johnston-Watt et al. |
| 8,275,724 B2 | 9/2012 | Hinchey et al. |
| 8,291,378 B2 | 10/2012 | Arnold et al. |

(Continued)

FOREIGN PATENT DOCUMENTS

| | | |
|---|---|---|
| WO | 2005/065368 A2 | 7/2005 |
| WO | WO-2008024539 A2 | 2/2008 |

(Continued)

OTHER PUBLICATIONS

International Search Report & Written Opinion received in PCT Application No. PCT/US2013/067414, dated Jul. 17, 2014, 12 pages.

(Continued)

*Primary Examiner* — Suraj M Joshi
(74) *Attorney, Agent, or Firm* — Hewlett Packard Enterprise Patent Department

(57) ABSTRACT

A method of executing a topology includes deriving executable logic from the topology. The method of executing the topology further includes, with an LCM engine, executing the topology based on the executable logic.

20 Claims, 14 Drawing Sheets

(56) References Cited

U.S. PATENT DOCUMENTS

| | | |
|---|---|---|
| 8,312,419 B2 | 11/2012 | Wilcock et al. |
| 8,320,381 B2 | 11/2012 | Lange |
| 8,335,851 B1 | 12/2012 | Vendrow |
| 8,341,427 B2 | 12/2012 | Auradkar et al. |
| 8,412,810 B1 | 4/2013 | Tompkins |
| 8,417,938 B1 | 4/2013 | Considine et al. |
| 8,423,731 B1 | 4/2013 | Nadathur et al. |
| 8,488,646 B2 | 7/2013 | Chang-Hasnain et al. |
| 8,983,987 B2 | 3/2015 | Ravi et al. |
| 9,578,063 B1 | 2/2017 | Iyer et al. |
| 9,628,360 B2 | 4/2017 | Nagai et al. |
| 9,634,965 B2 | 4/2017 | Mehta et al. |
| 9,791,908 B2 | 10/2017 | Grehan et al. |
| 9,876,684 B2 | 1/2018 | Gomadam et al. |
| 2004/0162741 A1 | 8/2004 | Flaxer et al. |
| 2006/0080412 A1 | 4/2006 | Oprea et al. |
| 2007/0156650 A1 | 7/2007 | Becker |
| 2008/0077970 A1 | 3/2008 | Hares |
| 2008/0161941 A1 | 7/2008 | Strassner et al. |
| 2008/0216006 A1 | 9/2008 | Jordan et al. |
| 2008/0244595 A1 | 10/2008 | Eilam et al. |
| 2008/0307104 A1 | 12/2008 | Amini et al. |
| 2009/0157419 A1 | 6/2009 | Bursey |
| 2009/0172689 A1 | 7/2009 | Bobak et al. |
| 2009/0204458 A1 | 8/2009 | Wiese et al. |
| 2010/0027552 A1 | 2/2010 | Hill |
| 2010/0115490 A1 | 5/2010 | Wilcock et al. |
| 2010/0142409 A1 | 6/2010 | Fallon et al. |
| 2010/0169860 A1 | 7/2010 | Biazetti et al. |
| 2010/0175060 A1 | 7/2010 | Boykin et al. |
| 2010/0223385 A1 | 9/2010 | Gulley et al. |
| 2010/0274635 A1 | 10/2010 | Flinn et al. |
| 2010/0325496 A1 | 12/2010 | Kumar |
| 2011/0022564 A1 | 1/2011 | Flinn et al. |
| 2011/0029810 A1* | 2/2011 | Jaisinghani ............ H04L 41/12 714/4.1 |
| 2011/0029882 A1* | 2/2011 | Jaisinghani ............ H04L 41/12 715/736 |
| 2011/0055707 A1 | 3/2011 | Kimmet |
| 2011/0066719 A1 | 3/2011 | Miryanov et al. |
| 2011/0072486 A1 | 3/2011 | Hadar et al. |
| 2011/0072487 A1 | 3/2011 | Hadar et al. |
| 2011/0075674 A1 | 3/2011 | Li et al. |
| 2011/0145035 A1 | 6/2011 | Franke et al. |
| 2011/0161696 A1 | 6/2011 | Fletcher |
| 2011/0196940 A1 | 8/2011 | Martinez et al. |
| 2011/0213765 A1 | 9/2011 | Cui et al. |
| 2011/0231899 A1 | 9/2011 | Pulier et al. |
| 2011/0238805 A1 | 9/2011 | Signori |
| 2011/0252096 A1 | 10/2011 | Ramaswamy et al. |
| 2011/0276583 A1 | 11/2011 | Stone et al. |
| 2011/0276685 A1 | 11/2011 | de Waal et al. |
| 2011/0289119 A1 | 11/2011 | Hu et al. |
| 2011/0296021 A1 | 12/2011 | Dorai et al. |
| 2012/0011077 A1 | 1/2012 | Bhagat |
| 2012/0054626 A1 | 3/2012 | Odenheimer |
| 2012/0102180 A1 | 4/2012 | Jaisinghani |
| 2012/0124211 A1 | 5/2012 | Kampas et al. |
| 2012/0151402 A1 | 6/2012 | Durham et al. |
| 2012/0173691 A1 | 7/2012 | Kothe et al. |
| 2012/0185913 A1 | 7/2012 | Martinez et al. |
| 2012/0191852 A1 | 7/2012 | Carter |
| 2012/0203888 A1 | 8/2012 | Balakrishnan et al. |
| 2012/0203908 A1 | 8/2012 | Beaty et al. |
| 2012/0204169 A1 | 8/2012 | Breiter et al. |
| 2012/0204187 A1 | 8/2012 | Breiter et al. |
| 2012/0215923 A1 | 8/2012 | Mohindra et al. |
| 2012/0239792 A1 | 9/2012 | Banerjee et al. |
| 2012/0246126 A1 | 9/2012 | Rodriguez et al. |
| 2012/0266156 A1 | 10/2012 | Spivak et al. |
| 2012/0271937 A1 | 10/2012 | Cotten et al. |
| 2012/0272249 A1 | 10/2012 | Beaty et al. |
| 2012/0311012 A1 | 12/2012 | Mazhar et al. |
| 2013/0007710 A1 | 1/2013 | Vedula et al. |
| 2013/0014107 A1 | 1/2013 | Kirchhofer |
| 2013/0042003 A1 | 2/2013 | Franco et al. |
| 2013/0051419 A1 | 2/2013 | Chang-Hasnain et al. |
| 2013/0073724 A1 | 3/2013 | Parashar et al. |
| 2013/0080902 A1 | 3/2013 | Jaisinghani |
| 2013/0086249 A1 | 4/2013 | White et al. |
| 2013/0086551 A1 | 4/2013 | Archer et al. |
| 2013/0132850 A1 | 5/2013 | Subramanian et al. |
| 2013/0185667 A1 | 7/2013 | Harper et al. |
| 2013/0191539 A1 | 7/2013 | Sailer et al. |
| 2013/0198346 A1 | 8/2013 | Jubran et al. |
| 2013/0232463 A1 | 9/2013 | Nagaraja et al. |
| 2013/0232480 A1* | 9/2013 | Winterfeldt ............... G06F 8/60 717/177 |
| 2013/0232497 A1 | 9/2013 | Jalagam et al. |
| 2013/0232498 A1 | 9/2013 | Mangtani et al. |
| 2013/0263209 A1 | 10/2013 | Panuganty |
| 2013/0268638 A1 | 10/2013 | Anderson et al. |
| 2013/0283174 A1 | 10/2013 | Faridian et al. |
| 2013/0297772 A1 | 11/2013 | Ashok et al. |
| 2014/0007079 A1 | 1/2014 | Whitney et al. |
| 2014/0074973 A1 | 3/2014 | Kumar et al. |
| 2014/0075426 A1 | 3/2014 | West et al. |
| 2014/0165060 A1 | 6/2014 | Muller et al. |
| 2014/0165138 A1 | 6/2014 | Maida-Smith et al. |
| 2014/0278623 A1 | 9/2014 | Martinez et al. |
| 2014/0282586 A1 | 9/2014 | Shear et al. |
| 2014/0344006 A1 | 11/2014 | Biazetti et al. |
| 2014/0372533 A1 | 12/2014 | Fu et al. |
| 2014/0380308 A1 | 12/2014 | Hassine et al. |
| 2015/0007169 A1 | 1/2015 | Li et al. |
| 2015/0067171 A1 | 3/2015 | Yum et al. |
| 2015/0074279 A1 | 3/2015 | Maes et al. |
| 2015/0089041 A1 | 3/2015 | Mehta et al. |
| 2015/0089068 A1 | 3/2015 | Islam et al. |
| 2015/0304231 A1 | 10/2015 | Gupte et al. |
| 2016/0057234 A1 | 2/2016 | Parikh et al. |
| 2016/0156661 A1 | 6/2016 | Nagaratnam et al. |
| 2016/0179600 A1 | 6/2016 | Joshi et al. |
| 2016/0205037 A1 | 7/2016 | Gupte et al. |
| 2016/0219097 A1 | 7/2016 | Gupte et al. |
| 2016/0254943 A1 | 9/2016 | Maes |
| 2016/0254957 A1 | 9/2016 | Maes |
| 2016/0254961 A1 | 9/2016 | Maes |
| 2016/0277250 A1 | 9/2016 | Maes |
| 2017/0048314 A1 | 2/2017 | Aerdts et al. |
| 2017/0063615 A1 | 3/2017 | Yang et al. |
| 2017/0171020 A1 | 6/2017 | Wei et al. |
| 2017/0257432 A1 | 9/2017 | Fu et al. |
| 2017/0302532 A1 | 10/2017 | Maes |
| 2017/0302537 A1 | 10/2017 | Maes |
| 2018/0046438 A1 | 2/2018 | Boutier et al. |

FOREIGN PATENT DOCUMENTS

| | | |
|---|---|---|
| WO | WO-2011014830 A1 | 2/2011 |
| WO | WO-2012062385 A1 | 5/2012 |
| WO | WO-2012082726 A2 | 6/2012 |
| WO | WO-2013006708 A1 | 1/2013 |
| WO | WO-2013055538 A1 | 4/2013 |
| WO | 2013/184134 A1 | 12/2013 |
| WO | 2014/007811 A1 | 1/2014 |
| WO | 2014/058411 A1 | 4/2014 |
| WO | WO-2014088537 A1 | 6/2014 |
| WO | 2015/065350 A1 | 5/2015 |
| WO | 2015/065355 A1 | 5/2015 |
| WO | 2015/065356 A1 | 5/2015 |
| WO | 2015/065359 A1 | 5/2015 |
| WO | 2015/065368 A1 | 5/2015 |
| WO | 2015/065370 A1 | 5/2015 |
| WO | 2015/065374 A1 | 5/2015 |
| WO | 2015/065382 A1 | 5/2015 |
| WO | 2015/065389 A1 | 5/2015 |
| WO | 2015/065392 A1 | 5/2015 |

(56) References Cited

OTHER PUBLICATIONS

International Search Report & Written Opinion received in PCT Application No. PCT/US2013/067423, dated Jul. 24, 2014, 13 pages.
International Search Report & Written Opinion received in PCT Application No. PCT/US2013/067439, dated Jul. 28, 2014, 10 pages.
International Search Report & Written Opinion received in PCT Application No. PCT/US2013/067492, dated Jul. 17, 2014, 13 pages.
International Search Report & Written Opinion received in PCT Application No. PCT/US2013/067513, dated Jul. 24, 2014, 13 pages.
International Search Report & Written Opinion received in PCT Application No. PCT/US2013/067531, dated Jul. 17, 2014, 12 pages.
International Search Report & Written Opinion received in PCT Application No. PCT/US2013/067542, dated Jul. 17, 2014, 13 pages.
International Search Report & Written Opinion received in PCT Application No. PCT/US2013/067570, dated Jul. 17, 2014, 13 pages.
International Search Report & Written Opinion received in PCT Application No. PCT/US2013/067574, dated Jul. 23, 2014, 11 pages.
Srivastava, G. et al., "A Comparison of Topology Control Algorithms for Ad-hoc Networks," (Research Paper), Oct. 17, 2003, 5 pages.
VMWARE, "Transform Your Datacenter Into an Agile Cloud," (Web Page), 2013, 5 pages.
WSO2, "WSO2 App Factory," (Web Page), 2001, 2 pages.
BMC Software, "BMC Cloud Lifecycle Management, Managing Cloud Services from Request to Retirement," (Research Paper), Solution White Paper, Aug. 23, 2011, 16 pages.
BMC Software, "BMC Cloud Management Functional Architecture Guide," (Research Paper), Technical White Paper, Sep. 30, 2010, 14 pages.
Calinescu, R., "General-purpose Autonomic Computing," (Research Paper), Sep. 8, 2008, 25 pages.
Enterasys, "Network Access Control Whitepaper," (Research Paper), Jul. 30, 2012, 23 pages.
Globus, "Provision Documentation 0.4," 2013, 10 pages.
Globusonline, "Provisioning and Managing a GP Instance," (Web Page), 2012, 11 pages.
Havevvala, P.H., "Overview of Oracle Enterprise Manager Management Packs," Dec. 2010, 13 pages.
IBM, "Accelerate Delivery with Collaborative Development and Operations," (Web Page), 2011, 2 pages.
International Search Report & Written Opinion received in PCT Application No. PCT/US2013/067397, dated Jul. 17, 2014, 15 pages.
International Search Report & Written Opinion received in PCT Application No. PCT/US2013/067406, dated Jul. 17, 2014, 15 pages.
European Patent Office, Extended European Search Report dated May 12, 2017 for EP application No. 13896357.4 (9 pages).
European Patent Office, Extended European Search Report, EP Application No. 13896362.4, pp. 1-10.
European Patent Office, Extended European Search Report, EP Application No. 13896706.2, dated Mar. 17, 2017, pp. 1-5.
Extended European Search Report dated May 2, 2017 for EP Application No. 13896812.8; pp. 10.
Extended European Search Report dated Mar. 22, 2017 for EP application No. 13896489.5; pp. 9.
Nguyen et al., "Blueprint Template Support for Engineering Cloud-Based Services," ServiceWave 2011: Towards a Service-Based Internet Lecture Notes in Computer Science, vol. 6994, 2011 (12 pages).
Nguyen et al., "Blueprinting Approach in Support of Cloud Computing," Mar. 21, 2012, Future Internet, vol. 4, No, 4 (25 pages).
Waizenegger et al., Policy 4TOSCA: A Policy-Aware Cloud Service Provisioning Approach to Enable Secure Cloud Computing, OTM 2013 (17 pages).
U.S. Appl. No. 15/028,460, Non Final Rejection dated Nov. 3, 2017, pp. 1-9 and attachments.
U.S. Appl. No. 15/028,460, Final Rejection dated Jun. 15, 2018, pp. 1-11 and attachments.
Todor Stefanov et al: "Algorithmic transformation techniques for efficient exploration of alternative application instances", Proceedings of the 10th. International Workshop on Hardware/Software Codesign. Codes 2002. Estes Park, Co, May 6-8, 2002; [Proceedings of the International Workshop on Hardware/Software Codesign], New York, NY : ACM, US, May 6, 2002 (May 6, 2002), pp. 7-12.
Office Action received for European Application No. 13896816.9, dated Mar. 9, 2018, 9 pages.
Office Action received for European Application No. 13896706.2, dated Apr. 17, 2018, 5 pages.
Office Action received for European Application No. 13896489.5, dated Jul. 24, 2018, 5 pages.
Office Action received for European Application No. 13896362.4, dated Jul. 26, 2018, 5 pages.
Office Action received for European Application No. 13896357.4, dated Jul. 11, 2018, 5 pages.
Office Action received for European Application No. 13896252.7, dated Jul. 11, 2018, 5 pages.
Maes, S. H.; "3mo. Non-final office action" cited in U.S. Appl. No. 15/028,510 dated Feb. 16, 2018; 26 pages.
International Search Report and Written Opinion received for PCT Patent Application No. 14582772, dated Jul. 23, 2014, 9 pages.
International Preliminary Report on Patentability received for PCT Patent Application No. PCT/US2013/067574, dated May 12, 2016, 8 pages.
International Preliminary Report on Patentability received for PCT Patent Application No. PCT/US2013/067570, dated May 12, 2016, 10 pages.
International Preliminary Report on Patentability received for PCT Patent Application No. PCT/US2013/067542, dated May 12, 2016, 10 pages.
International Preliminary Report on Patentability received for PCT Patent Application No. PCT/US2013/067531, dated May 12, 2016, 9 pages.
International Preliminary Report on Patentability received for PCT Patent Application No. PCT/US2013/067513, dated May 12, 2016, 10 pages.
International Preliminary Report on Patentability received for PCT Patent Application No. PCT/US2013/067492, dated May 12, 2016, 10 pages.
International Preliminary Report on Patentability received for PCT Patent Application No. PCT/US2013/067439, dated May 12, 2016, 7 pages.
International Preliminary Report on Patentability received for PCT Patent Application No. PCT/US2013/067423, dated May 12, 2016, 10 pages.
International Preliminary Report on Patentability received for PCT Patent Application No. PCT/US2013/067414 , dated May 12, 2016, 9 pages.
International Preliminary Report on Patentability received for PCT Patent Application No. PCT/US2013/067406, dated May 12, 2016, 12 pages.
International Preliminary Report on Patentability received for PCT Patent Application No. PCT/US2013/067397, dated May 12, 2016, 12 pages.
Extended European Search Report, EP Application No. 13896706 2, dated Mar. 17, 2017, pp. 1-5, EPO.
Extended European Search Report, EP Application No. 13896489.5, dated Mar. 22, 2017, pp. 1-9, EPO.
European Search Report and Search Opinion Received for EP Application No. 13896816.9, dated Aug. 2, 2017, 13 pages.
European Search Report and Search Opinion Received for EP Application No. 13896812.8, dated May 2, 2017, 9 pages.
European Search Report and Search Opinion Received for EP Application No. 13896575.1, dated May 19, 2017, 9 pages.

(56) References Cited

OTHER PUBLICATIONS

European Search Report and Search Opinion Received for EP Application No. 13896558.7, dated Aug. 10, 2017, 14 pages.
European Search Report and Search Opinion Received for EP Application No. 13896489.5, dated Mar. 22, 2017, 9 pages.
European Search Report and Search Opinion Received for EP Application No. 13896441.6, dated May 23, 2017, 7 pages.
European Search Report and Search Opinion Received for EP Application No. 13896317.8, dated Apr. 25, 2017, 10 pages.
European Search Report and Search Opinion Received for EP Application No. 13896252.7, dated May 12, 2017, 9 pages.
European Patent Office, Extended European Search Report for Appl. No. 13896317.8 dated Apr. 25, 2017 (11 pages).
European Patent Office, Extended European Search Report for Appl. No. 13896441.6 dated May 23, 2017 (7 pages).
European Patent Office, Extended European search report dated Mar. 22, 2017 for EP application No. 13896489.5 (9 pages).
Baryannis et al. ("Lifecycle Management of Service-based Applications on Multi-Clouds: A Research Roadmap", ACM, 2013, pp. 13-20).
"Heat", OpenStack Orchestration, available online at <https://wiki.openstack.org/wiki/Heat>, retrieved on Oct. 16, 2018, 5 pages.
"AWS Cloud?Formation" Model and provision all your cloud infrastructure resources, available online at <https://aws.amazon.com/cloudformation/>, retrieved on Oct. 16, 2018, 12 pages.

* cited by examiner

EXECUTION OF A TOPOLOGY

CROSS-REFERENCE TO RELATED APPLICATION

This application is a U.S. National Stage Application of and claims priority to international Patent Application No. PCT/US2013/067570, filed on Oct. 30, 2013, and entitled "EXECUTION OF A TOPOLOGY," the entire contents of which are hereby incorporated in its entirety.

BACKGROUND

An increasingly larger number of business entities and individuals are turning to cloud computing and the services provided through a cloud computing system in order to, for example, sell goods or services, maintain business records, and provide individuals with access to computing resources, among other cloud-related objectives. Cloud computing provides consumers of the cloud with scalable and pooled computing, storage, and networking capacity as a service or combinations of such services built on the above. A cloud may be designed, provisioned, deployed, and maintained by or for the entity for which the cloud computing system is created. Designing, provisioning, deploying, and maintaining a cloud computing system may be a difficult task.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

Cloud computing provides services for a user's data, software, and computation. Applications deployed on resources within the cloud service may be manually deployed. This manual deployment consumes considerable administrative time. The manual steps of deploying an application may include the provisioning and instantiation of the infrastructure. This may include linking the installation of an application or a platform such as middleware and DB, applications or deployment of an image with or without the full knowledge of the deployed infrastructure. Manual deployment may further include numerous sequences of steps launched by a user who attempts to deploy the application. Thus, the manual linking of an application to a deployed infrastructure consumes large amounts of computing and personnel resources, and may lead to mistakes and irreconcilable issues between the application and the underlying infrastructure. Linking of an application to a deployed infrastructure may be automated with a number of tools, scripts, and executables, with orchestrators automating the sequence of execution of these processes. A number of devices used in the designing, provisioning, deploying, and maintaining of applications deployed on resources within the cloud service may include data centers, private clouds, public clouds, managed clouds, hybrid clouds, and combinations thereof.

More specifically, cloud services provided to users over a network may be designed, provisioned, deployed, and managed using a cloud service manager. The cloud service provider or other entity or individual designs, provisions, deploys, and manages such a cloud service that appropriately consists of a number of services, applications, platforms, or infrastructure capabilities deployed, executed, and managed in a cloud environment. These designs may then be offered to user who may order, request, and subscribe to them from a catalog via a market place or via an API call, and then manage the lifecycles of a cloud service deployed based on the designs through the same mechanism. The service designs in a cloud service manager such as CLOUD SERVICE AUTOMATION (CSA 3.2) designed and distributed by Hewlett Packard Corporation, described in more detail below, are expressed with "blueprints."

Blueprints describe services in terms of the collections of workflows that are to be executed to provision or manage all the components that make up the service in order to perform a particular lifecycle management action. Some of the functions of the workflows defined by blueprints are actual life cycle management actions that are then performed as calls to a resource provider. The resource provider converts the calls into well formed and exchanged instructions specific to the particular resource or instance offered by a resource provider.

Figure 1:
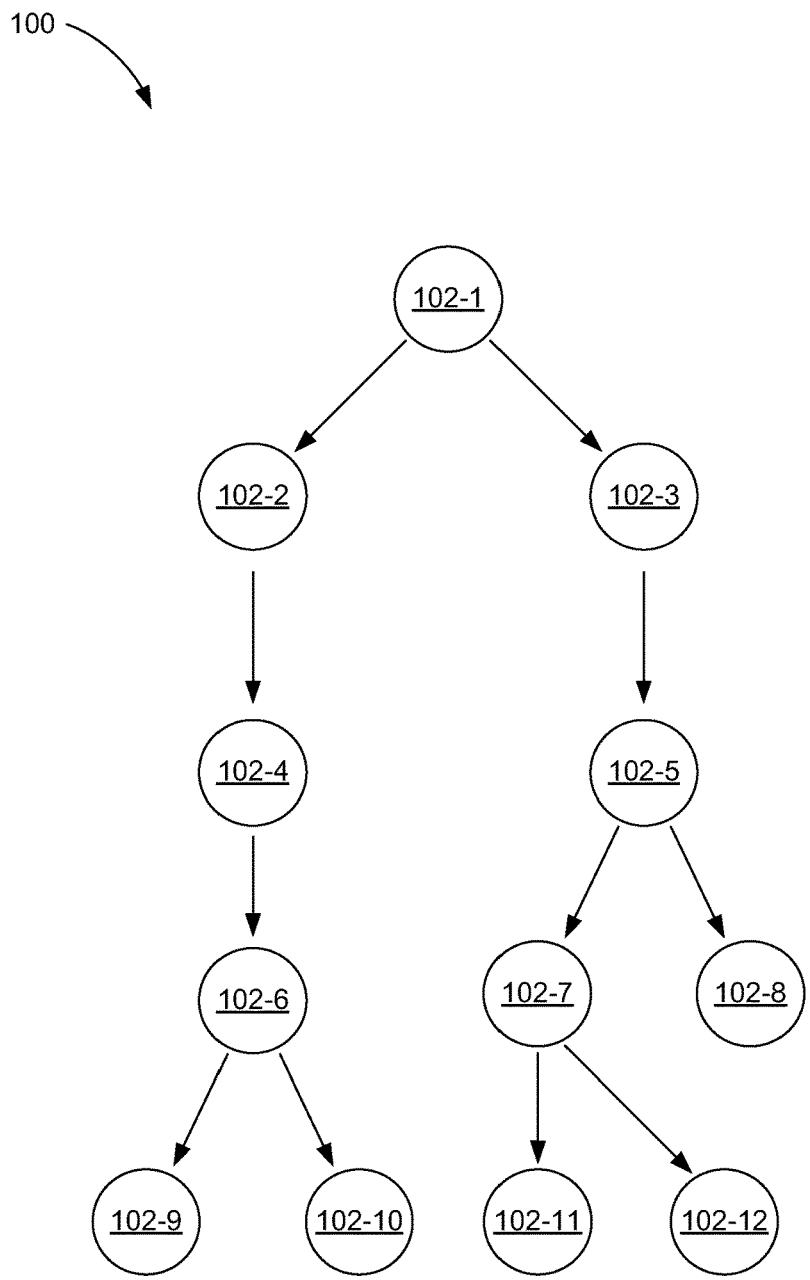
FIG. 1 is a block diagram of a blueprint, according to one example of the principles described herein.

FIG. 1 is a block diagram of a blueprint (100), according to one example of the principles described herein. Each object (102-1, 102-2, 102-3, 102-4, 102-5, 102-6, 102-7, 102-8, 102-9, 102-10, 102-11, 102-12) in the blueprint may be associated with action workflows that call resource providers. A number of challenges exist with a blueprint (100) approach to designing, provisioning, deploying, and managing cloud services. The structure of a blueprint, while consisting of objects comprising properties and actions linked by relationships, do not identify relationships to physical topologies such as, for example, the actual physical architecture of the system that supports the cloud service. This renders it difficult to associate additional metadata with the blueprints (100) to describe, for example, policies associated with the system. Further, this association of policies with nodes in a blueprint (100) is not intuitive for a designer or administrator of the to-be-deployed cloud service.

Further, the structures of blueprints (100), for the same reason, are difficult to use as models of applications or templates of infrastructures as HP CONTINUOUS DELIVERY AUTOMATION (CDA) does. HP CDA is system tool utilized within a topology designer that independently models infrastructure and application requirements while managing versions, configurations, and other application components. HP CDA 1.2 is also developed and distributed by Hewlett Packard Corporation. The structures of blueprints (100), for the same reason given above, are difficult to use as models of applications because blueprints do not describe the architecture of the application. Further, blueprints are difficult to use as templates of an infrastructure because they also do not describe the architecture of the infrastructure. As a result, systems aiming at modeling application models and infrastructure or platform templates, and mapping the application models and infrastructure or platform templates to each other are not easily reconciled with the blueprints because they are based on different methods of modeling these services.

Figure 2:
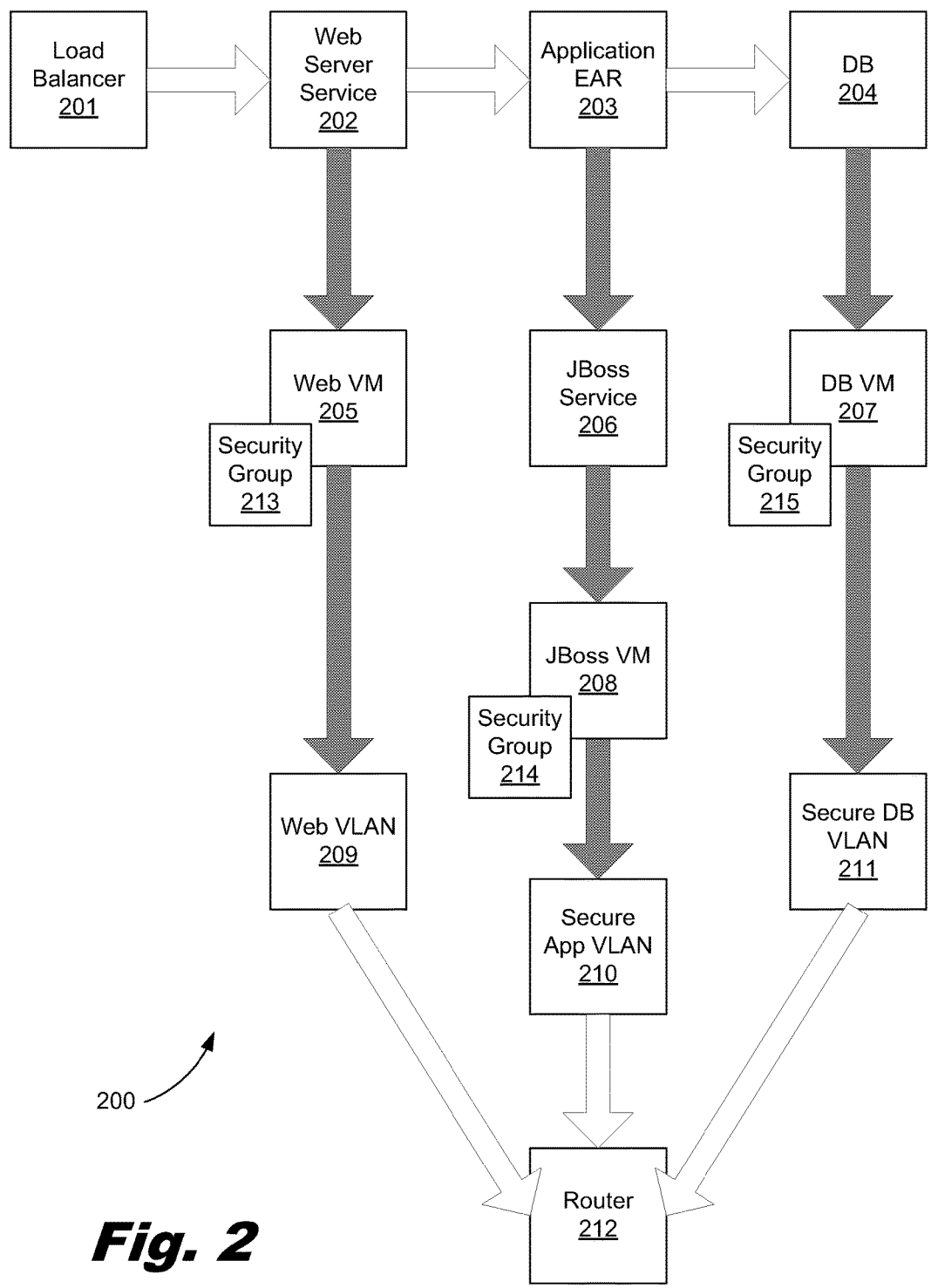
FIG. 2 is a block diagram showing an architecture derived topology, according to one example of the principles described herein.

The present systems and methods describe architecture-descriptive topologies that define the physical architecture of a system that constitutes a cloud service. FIG. 2 is a block diagram showing an architecture derived topology (200), according to one example of the principles described herein. As depicted in FIG. 2, the architecture derived topology (200) may comprise a number of nodes (201, 202, 203, 204, 205, 206, 207, 208, 209, 210, 211, 212, 213, 214, 215) associated with one another. Associations between nodes within the topology (200) are indicated by the open arrows. A number of nodes (201, 202, 203, 204, 205, 206, 207, 208, 209, 210, 211, 212, 213, 214, 215) within the topology (200) may also be aggregated with one another as designated by the filled arrows. Aggregation is a computing term used to describe combining (aggregating) multiple network connections in parallel to increase throughput beyond what a single connection could sustain, and to provide redundancy in case one of the links fails.

For example, the load balancer (201), web server service (202), application enterprise archive (203), and the database (204) are associated with one another. The web server service (202) is aggregated with a web virtual machine (205) and its security group (213) as well as a web virtual local area network (209). Similarly, the application enterprise archive (203) is aggregated with an application server service such as the JavaBeans Open Source Software Application Server (JBoss) service (206), a JBoss virtual machine (208) and its associated security group (214), and a secure application virtual local area network (210). Again, similarly, the database (204) is associated with a database virtual machine (207) and its security group (215), and a secure database virtual local area network (211). The web virtual local area network (209), secure application virtual local area network (210), and secure database virtual local area network (211) are then associated with a router (212).

Thus, a cloud service based on an instantiation of the architecture derived topology (200) may be expressed as a topology of nodes with a number of relationships defined between a number of nodes within the topology. A number of properties and actions are associated with a number of the nodes, a number of groups of nodes, a portion of the topology, the topology as a whole, or combinations thereof. Further, a number of policies are associated with the number of the nodes, a number of groups of nodes, a portion of the topology, the topology as a whole, or combinations thereof. Still further, a number of lifecycle management actions (LCMAs) are associated with the number of the nodes, a number of groups of nodes, a portion of the topology, the topology as a whole, or combinations thereof.

Thus, the present systems and methods describe cloud service broker or manager that supports both topologies and blueprints while using the same lifecycle management engine. The lifecycle management engine supports lifecycle management of cloud services, and mapping of application models with infrastructure templates. The present systems and methods also describe a policy-based framework for managing the provisioning, deployment, monitoring, and remediation processes within a cloud service. Further, the present systems and methods provide support for usage models supported by CSA, CDA, and blueprints as will be described in more detail below.

The present systems and methods further describe execution of topologies and blueprints using the same lifecycle management (LCM) engine. In the case of blueprints, the blueprints may be first converted into topologies or a topology may be derived from a blueprint. Further, the blueprint may be directly executed by the LCM engine described herein to produce an instantiated service without first converting the blueprint into a topology, or deriving a topology from the blueprint. The topologies executed by the LCM engine may be generated de novo, generated from a stitching method performed on an application model and an infrastructure template, or from a blueprint-derived topology. The blueprints may directly be executed by the LCM engine. A number of scripts or executable logic may be derived from the topologies. The executable logic is converted into an execution plan. Instantiation may take place by calling a number of resource providers to provision a number of devices, and instantiate the topology or blueprint based on the executable logic and execution plan.

As used in the present specification and in the appended claims, the term "broker" is meant to be understood broadly as any computing device or a collection of computing devices in a network of computing devices that manages the designing, provisioning, deployment of a topology within the cloud, and the maintenance and life cycle management of (an) instantiated service based on that topology.

As used in the present specification and in the appended claims, the term "cloud service" is meant to be understood broadly as any number of services provided over a number of computing devices that are connected through a real-time communication network. Cloud services may include services provided on a distributed system implementing distributed hardware and software resources. In one example, a cloud service may be any service offered on a private cloud, public cloud, managed cloud, hybrid cloud, or combinations thereof. In another example, a cloud service may be services provided on physically independent machines such as, for example, a data center.

Further, as used in the present specification and in the appended claims, the terms "node or "computing device" are meant to be understood broadly as any hardware device, virtual device, group of hardware devices, group of virtual devices, or combination thereof within a network. Nodes may include, for example, servers, switches, data processing devices, data storage devices, load balancers, routers, and virtual embodiments thereof, among many other types of hardware and virtual devices. Further, nodes may be representations of the above hardware and virtual devices before execution and instantiation of a topology of which the node is a part.

Still further, as used in the present specification and in the appended claims, the term "topology" is meant to be understood broadly as data representing a graph of nodes where branches between the nodes represent relationships between the nodes. The nodes may comprise any number of computing devices located within a network. Thus, the topology of the network may comprise the physical and logical layout of networked computing devices, and definitions of the relationships between the computing devices. A number of policies and lifecycle management actions (LCMA) may be associated with the topologies, portions of the topologies, nodes within the topologies, groups of nodes within the topologies, and combinations thereof.

Still further, as used in the present specification and in the appended claims, the term "blueprint" is meant to be understood broadly as an execution flow for allowing automation of cloud service deployment and life cycle management of cloud services. A blue print may include a functional description of a number of hardware and/or virtualized components included within a service such as, for example, operating systems, application stacks, databases. A blueprint may further include a functional description of the configuration and connectivity between the hardware and virtualized components. The blueprints may also include a number of deployment models to enable the functional description to be deployed. The blueprints may further include a set of user-configurable options to allow a user to configure a number of optional aspects of the deployed service. Blueprints are an example of non architecture derived executable topologies.

Still further, in addition to the blueprints described above, the present disclosure provides for the utilization of executable topologies. Thus, the present systems and methods provide for the execution and instantiation of both blueprint- and architecture-derived topologies. Both blueprint- and architecture-derived topologies are executable. Thus, as used in the present specification and in the appended claims, the term "topology" is meant to be understood broadly as any set of executable logic or interpretable logic that may be expressed as executable logic that defines the characteristics of the network to be instantiated. The topology may define a number of nodes. Further, the topology may define a number of policies and lifecycle management actions associated with the nodes as a number of groups, individually, or a combination thereof. In one example, blueprints may be expressed as topologies. In this example, the blueprint-derived topologies may also define a number of nodes and a number of policies and lifecycle management actions associated with the nodes within the topologies, groups of nodes within the topologies, portions of the topologies, the topology as a whole, and combinations thereof.

Still further, as used in the present specification and in the appended claims, the term "policy" is meant to be understood broadly as any data or metadata used to assist in the management of the provisioning, deploying, monitoring, enforcement, and remediation within a cloud service. The policies may represent a number of rules or sets of rules that are applicable to the provisioning, deploying, monitoring, enforcement, and remediation tasks associated with a number of computing devices within a cloud service environment.

Still further, as used in the present specification and in the appended claims, the term "user" is meant to be understood broadly as any individual or entity for whom or by whom a cloud service is designed, provisioned, deployed, monitored, policy enforced, incident remediated, otherwise managed, or combinations thereof. In one example, the user may purchase use of the cloud service at a cost. For example, the user may pay a subscription to use the cloud resources and services, and, in this case, also be classified as a subscriber. In another example, a user may be a designer or administrator of the cloud service. In still another example, a user may be any individual who manages the cloud service.

Even still further, as used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

The present systems may be utilized in any data processing scenario including, for example, within a network including the design, provisioning, deployment, and management of a number of computing devices within the network. For example, the present systems may be utilized in a cloud computing scenario where a number of computing devices, real or virtual, are designed, provisioned, deployed, and managed within a service-oriented network. In another example, the present systems may be utilized in a stand alone data center or a data center within a cloud computing scenario. The service oriented network may comprise, for example, the following: a Software as a Service (SaaS) hosting a number of applications; a Platform as a Service (PaaS) hosting a computing platform comprising, for example, operating systems, hardware, and storage, among others; an Infrastructure as a Service (IaaS) hosting equipment such as, for example, servers, storage components, network, and components, among others; application program interface (API) as a service (APIaaS), other forms of cloud services, or combinations thereof. The present systems may be implemented on one or multiple hardware platforms, in which the modules in the system are executed on one or across multiple platforms. Such modules may run on various forms of cloud technologies and hybrid cloud technologies or offered as a SaaS (Software as a service) that may be implemented on or off the cloud.

Further, the present systems may be used in a public cloud network, a private cloud network, a hybrid cloud network, other forms of networks, or combinations thereof. In one example, the methods provided by the present systems are provided as a service over a network by, for example, a third party. In another example, the methods provided by the present systems are executed by a local administrator. In still another example, the present systems may be utilized within a single computing device. In this data processing scenario, a single computing device may utilize the devices and associated methods described herein to deploy cloud services and manage life cycles of the cloud services. In the above examples, the design of the cloud service, provisioning of a number of computing devices and associated software within the cloud service, deployment of the designed and provisioned cloud resources and services, management of the cloud resources and services, and combinations thereof may be provided as the service.

Aspects of the present disclosure may be embodied as a system, method, or computer program product, and may take the form of an entirely hardware embodiment, or an embodiment combining software and hardware aspects that may all generally be referred to herein as a "circuit," "module" or "system." Furthermore, aspects of the present disclosure may take the form of a computer program product embodied in a number of computer readable mediums comprising computer readable program code embodied thereon. Any combination of one or more computer readable mediums may be utilized.

A computer readable medium may be a computer readable storage medium in contrast to a computer readable signal medium. A computer readable storage medium may be, for example, an electronic, magnetic, optical, electromagnetic, infrared, or semiconductor system, apparatus, or device, or any suitable combination of the foregoing. More specific examples of the computer readable storage medium may include the following: an electrical connection having one or more wires, a portable computer diskette, a hard disk, a random access memory (RAM), a read-only memory (ROM), an erasable programmable read-only memory (EPROM or Flash memory), a compact disc read-only memory (CD-ROM), an optical storage device, a magnetic storage device, or any suitable combination of the foregoing. In the context of this disclosure, a computer readable storage medium may be any tangible medium that can contain, or store a program for use by or in connection with an instruction execution system, apparatus, or device.

Throughout the present disclosure, various computing devices are described. The computing devices may comprise real or virtual computing elements including data processing devices, data storage devices, and data communication devices. Although these various devices may be described in connection with real and physical devices, any number of the devices may be virtual devices. The virtual devices, although describing a software-based computer that is based on specifications of emulated computer architecture and functions of a real world computer, the virtual devices comprise or are functionally connected to a number of associated hardware devices. Accordingly, aspects of the present disclosure may be implemented by hardware elements, software elements (including firmware, resident software, micro-code, etc.), or a combination of hardware and software elements.

Figure 3A:
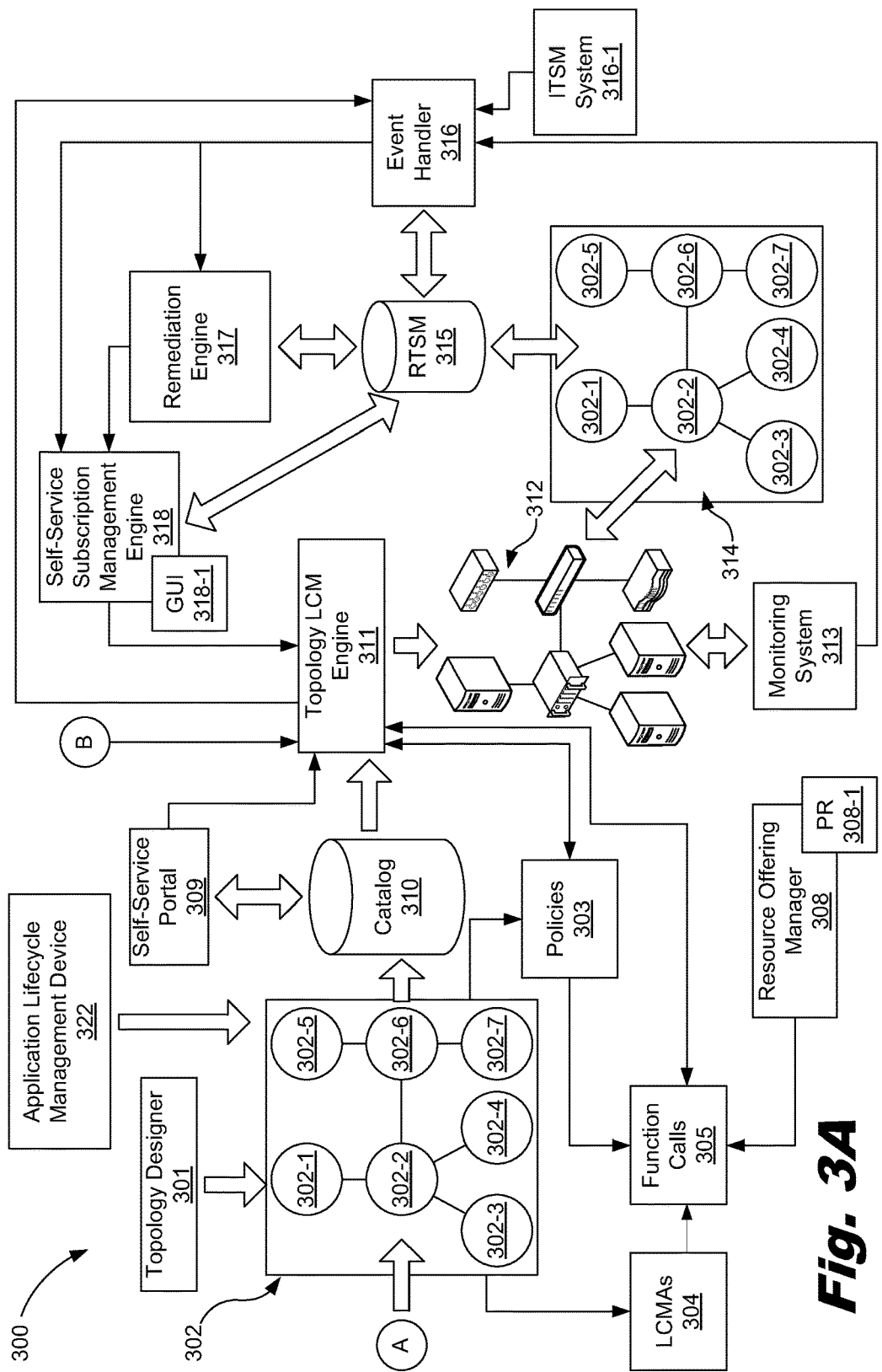
FIGS. 3A and 3B depict a block diagram showing a functional overview of a topology-based management broker for designing, provisioning, deploying, monitoring, and managing a cloud service, according to one example of the principles described herein.
Figure 3B:
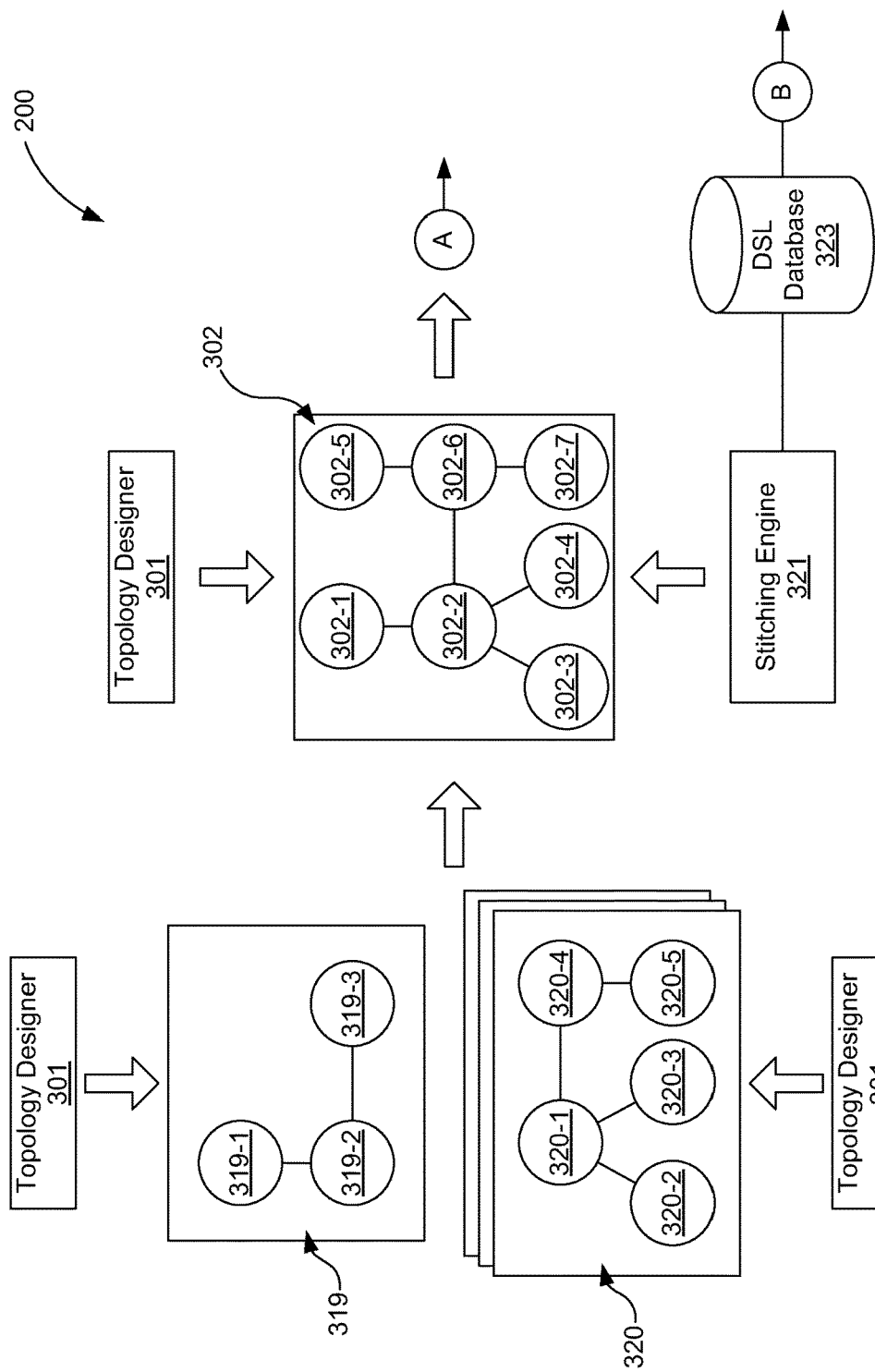

FIGS. 3A and 3B depict a block diagram of a topology-based management broker (300) along with a designing phase for provisioning, deploying, monitoring, protecting and remediating a cloud service, according to one example of the principles described herein. The system of FIGS. 3A and 3B support both topologies and blueprints while using the same lifecycle management engine as will be described in more detail below.

Figure 4:
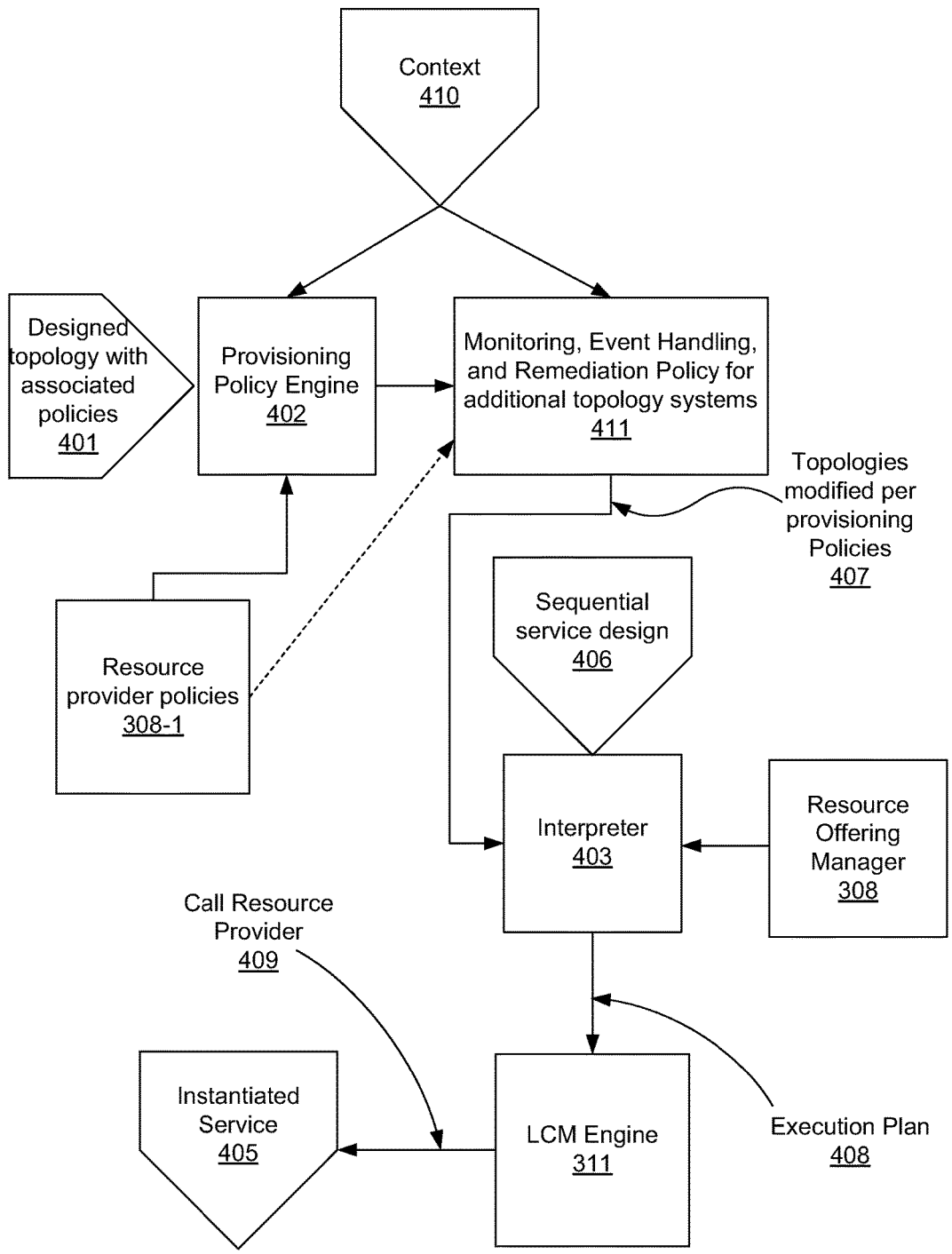
FIG. 4 is a block diagram of an execution flow of the execution of a topology using provisioning policies, according to one example of the principles described herein.

FIG. 4 is a block diagram showing a common platform (400) for topology-based management broker (300) of FIGS. 3A and 3B at a high level, according to one example of the principles described herein. As depicted in FIGS. 3A and 3B, one or a number of topology designers (301) contribute in designing various aspects of the cloud service topology. In one example, topology design is performed via a design tool that uses hardware devices and software modules such as graphical user interfaces (GUI) and coding scripts. A human designer designs the topology with the use of a design tool (301). Thus, the design of the topology (302) is achieved through a combination of autonomous and human-provided design methods. In one example, the topology designer (301) may be an interface utilizing API's that enables separate creation of an application model (FIG. 3B, 319) and its associated components along with creation of an infrastructure template (FIG. 3B, 320) which specifies infrastructure and lifecycle conditions for the infrastructure.

The subsystem depicted in FIG. 3A of the overall topology-based management broker (200) comprises a subsystem capable of provisioning, deploying, monitoring, enforcing policies within a cloud service, and remediating incidents within the cloud service. These tasks are all performed with the use of topologies with LCMAs and policies, whether the topologies are blueprint or architecture derived. Thus, the present systems and associated methods also support all the use cases that CSA 3.2 supports. As described above, CSA 3.2 is an automation system tool used to deploy and manage cloud computing applications, and is developed and distributed by Hewlett Packard Corporation. CSA 3.2 technologies are capable of supporting blueprints or architecture topologies. Further, CSA is described in International Patent App. Pub. No. PCT/US2012/045429, entitled "Managing a Hybrid Cloud Service," to Maes et al., which is hereby incorporated by reference in its entirety. As will be described in more detail below, the subsystem depicted in FIG. 3A uses a number of types of policies and lifecycle management actions (LCMAs) to provision, deploy, monitor, enforce policies within, and remediate incidents within a deployed cloud service.

Further, the subsystem depicted in FIG. 3B of the overall topology-based management broker (200) comprises a subsystem capable of independently modeling infrastructure and application requirements of a topology on the same stack as the subsystem depicted in FIG. 3A. The present systems and associated methods also support all the use cases that a CDA subsystem such as those use cases of CDA 1.2 support. As described above, CDA is an automation system tool utilized within a topology designer that independently models infrastructure and application requirements while managing versions, configurations, and other application components. CDA 1.2 is also developed and distributed by Hewlett Packard Corporation. Further, CDA is described in International Patent App. Pub. No. PCT/US2012/041625, entitled "Cloud Application Deployment," to Maes et al., which is hereby incorporated by reference in its entirety.

In this manner, the subsystems of FIGS. 3A and 3B work under a common stack and work together within the topology-based management broker (200) as a single computing system with common use of topologies, realized topologies, and policies to support all use cases of constructing topologies and supporting multiple providers' associated technologies. Thus, in one example, the present systems and methods reconcile the differing models, templates, and blueprints used respectively by CDA and CSA by utilizing, on the same stack, designed topologies (preferably architecture derived) of a cloud service, a number of policies, and a number of LCMAs associated with the topology nodes/subsets/full.

As depicted in FIG. 3A, a topology designer (301) may design and present a lifecycle management (LCM) topology (302) to the topology-based management broker (200). In one example, the topology designers (301) described herein may be an integrated part of the topology-based management broker (200). In another example, the topology designers (301) may be separate from the topology-based management broker (200). In another example, a number of persons may use the topology designers (301) to design the topologies (302). These individuals may be service designers, infrastructure architects or administrators, system administrators, information technology operators, offer managers, or users, among other personnel with roles in the design of a topology. In still another example, the topology designers (301) may be operated by a third party.

The LCM topology (302) may define a number of nodes (302-1, 302-2, 302-3, 302-4, 302-5, 302-6, 302-7), and a number of relationships between the nodes (302-1, 302-2, 302-3, 302-4, 302-5, 302-6, 302-7). Although in FIG. 3A, seven nodes are depicted, any number of nodes may be designed into the topology (302) to achieve any data processing objectives. In one example, the topology-based management broker (200) may represent the topology (302) as an extensible markup language (XML) file. In another example, the topology-based management broker (200) may represent the topology (302) in JavaScript object notation (JSON) format; a text-based open standard designed for human-readable data interchange that is derived from the JavaScript scripting language for representing objects. In still another example, the topology-based management broker (200) may represent the topology (302) in YAML syntax format; a human-readable data serialization format.

In FIG. 3A, the relationships between nodes (302-1, 302-2, 302-3, 302-4, 302-5, 302-6, 302-7) are depicted as lines connecting the nodes (302-1, 302-2, 302-3, 302-4, 302-5, 302-6, 302-7). Each of the nodes (302-1, 302-2, 302-3, 302-4, 302-5, 302-6, 302-7), the entire topology (302), a group of nodes (302-1, 302-2, 302-3, 302-4, 302-5, 302-6, 302-7), portions of the topology (302), or combinations thereof are associated with a number of policies (303). Policies (303) are data or metadata provided in the same file describing the nodes or topology, or in a file associated therewith. In one example, the association of the policies (303) within the topology (302) may be performed during the designing of the topology (302), by, for example, an administrator when offering the design. In another example, the association of the policies (303) within the topology (302) may be performed during the designing of the topology (302) when a user, for example, selects the design as a subscription or request.

Further, in one example, the addition of a policy (303) to the topology or portions thereof may cause the design of the topology to change. In this example, a policy (303) added to an element of the topology (302) may effect a number of other policies. For example, associating with a topology (302) a policy that indicates that a node be highly available may evolve the policies (303) and topology (302) as a whole to require, for example, a cluster of nodes. In this manner, policies may drive the design of the topology (302).

Each of the nodes (302-1, 302-2, 302-3, 302-4, 302-5, 302-6, 302-7), the entire topology (302), a group of nodes (302-1, 302-2, 302-3, 302-4, 302-5, 302-6, 302-7), portions of the topology (302), or combinations thereof are further associated with a number of lifecycle management actions (LCMAs) (304). In examples where LCMAs (304) are associated with the nodes, a single LCMA is associated with a given node. In examples where a number of LCMAs are associated with portions of the topology (302) or the topology (302) as a whole, the LCMAs are subjected to an orchestration of resource providers.

LCMAs are expressed as a number of application programming interfaces (APIs), wherein the LCMAs are called during execution of the topology (302), and a number of computing resources are provisioned for purposes of managing the lifecycle of a given cloud capability. In one example, the LCMAs may be accessed via uniform resource identifiers (URIs) of application programming interfaces (APIs) to perform calls in order to execute the APIs. In one example, the LCMAs are provided by reference within the file comprising the data or metadata described above in connection with the policies (303).

In one example, the LCMAs are associated with the aspects of the topology by default by virtue of what computing device the node or nodes (302-1, 302-2, 302-3, 302-4, 302-5, 302-6, 302-7) represent. In another example, the LCMAs are associated with the aspects of the topology by explicitly providing a number of functions, $F_{Action}$, that define how to select a resource provider to implement the action based on the policies associated with the aspects of the topology and the policies of the different relevant resource providers. These functions define how a resource provider is selected to implement the action based on the policies associated with the aspect of the topology and the policies of the different relevant resource providers.

The policies and LCMAs will be denoted herein by elements 303 and 304, respectively, to denote that the policies (303) and LCMAs (304) are associated with the nodes (302-1, 302-2, 302-3, 302-4, 302-5, 302-6, 302-7), the entire topology (302), a group of nodes (302-1, 302-2, 302-3, 302-4, 302-5, 302-6, 302-7), portions of the topology (302), or combinations thereof. In one example, the association of the policies and LCMAs with aspects of the topology is performed via the topology designer (301).

In one example, although not depicted, a subset of nodes making up a group may also be associated with a number of policies (303) and a number of LCMAs (304). In this example, a number of nodes, for example, nodes (302-2, 302-3, 302-4, 302-6, 302-7), may be associated as a group with a number of policies (303) and a number of LCMAs (304) associated therewith. Several groupings of the nodes may be present within the entire topology (302). In one example, the groups of nodes may overlap, in which a single node in a first group of nodes may also belong to a second group of nodes, and be subjected to both the first and second groups of nodes' policies (303) and LCMAs (304). Policies and their associations with individual nodes and groups of nodes will be described in more detail below.

The policies (303) associated with the nodes may be expressed and attached with the nodes in any manner (302-1, 302-2, 302-3, 302-4, 302-5, 302-6, 302-7). In one example, the policies (303) are associated with the nodes (302-1, 302-2, 302-3, 302-4, 302-5, 302-6, 302-7) by defining properties of the nodes (302-1, 302-2, 302-3, 302-4, 302-5, 302-6, 302-7). In another example, the policies (303) are associated with the nodes (302-1, 302-2, 302-3, 302-4, 302-5, 302-6, 302-7) by metalanguage expressions.

The policies (303) are a number of descriptions, metadata, workflows, scripts, rules, or sets of rules that are applicable to guiding the provisioning, monitoring, enforcement, governance, and remediation tasks associated with the lifecycle management of a number of nodes (302-1, 302-2, 302-3, 302-4, 302-5, 302-6, 302-7) within a cloud service environment in which the topology (302) is to be or has been implemented. The policies (303) define the access control and usage control of the APIs of the topology-based management broker (200). Further, policies (303) define the access control and usage control of the APIs used to manage or use the instantiated services. For example, when a security threat is detected by a monitoring system (313), a remediation option may comprise making changes to a number of access control policies.

The policies (303) may be associated with and operable against a number of individual nodes, a number of groups of nodes, a number of nodes of a class of nodes, a subset of the nodes within the entire topology of the cloud service; the entire topology of the cloud service as a whole, or combinations thereof. If the policies (303) are initiated on the individual nodes, groups of nodes, or the entire topology of the cloud service as a whole, the policies will guide how life cycle management actions are taken with respect to, or performed on the individual nodes, groups of nodes, nodes of a class of nodes, a subset of the nodes within the entire topology of the cloud service, or the entire topology of the cloud service as a whole.

On example of a type of policy is a provisioning policy. Provisioning policies may, if implemented, define the characteristics of the computing devices that comprise the cloud when the topology is provisioned, deployed, and executed. This provisioning can include the infrastructure and platform of the topology (302). The provisioning policies may include definitions of characteristics such as, for example, the physical location of a node. Provisioning policies may also include definitions of characteristics such as, for example, a geographical or deployment type location such as a network zone with or without access to an internet or behind or not behind a firewall, among other geographical or deployment type provisioning policies. In this example, a policy may have a provisioning policy component that may be associated with a server device that requires the server device to be located in a particular geographic area of a country, a particular region such as, for example, the east coast of the United States versus the west Coast, a particular server facility, or any other geographic location.

As to a provisioning policy that defines a physical location of the computing device, other characteristics may include, for example, the level of security of the location or access to the internet at which the node is located. Other provisioning policies may also include, for example, the speed in, for example, bandwidth of the network to which the node is coupled, whether the node is to be connected to an internet or intranet such as, for example, a demilitarized zone (DMZ) or perimeter network, whether the node is firewalled, whether the node has access to an internet, whether the node is to be located on top of another node, and whether the node is to be located on top of another node using a particular infrastructure element or platform, among other provisioning policies.

Provisioning policies may also, if implemented, rely on the requirements and capabilities of the nodes within the proposed cloud service that is based on the topology (302). Requirements define the needs of nodes (302-1, 302-2, 302-3, 302-4, 302-5, 302-6, 302-7) such as, for example, server or network needs in relation to processing, memory, and operating system (OS) needs, among other forms of needs. For example, the requirements policies may indicate that a node requires particular software or a particular software version associated with it such as a particular operating system. As another example, a requirements policy may also indicate that a particular node may require additional hardware devices associated with it such as, for example, a server device, a server group, or a high availability configuration, among others.

Capabilities such as the nature of the processors, memory, capacity, OS, middleware type and version, among others, define what each node (302-1, 302-2, 302-3, 302-4, 302-5, 302-6, 302-7) offers. Thus, in one example, capabilities policies may indicate that a node is capable of processing data at a certain rate. In another example, a capabilities policy may indicate that a memory device may have a terabyte (TB) of data storage space.

In still another example, the requirements policies may indicate that a node requires a particular computing platform. When designing a topology (302), the topology or association of metadata supports capturing data defining a number of hardware devices within the computing platform including hardware architecture and a software framework (including application frameworks). When the metadata is presented or associated, it is used to guide provisioning policies in order to better select appropriate elements within the computing platform such as, for example, a suitable data center. The metadata, when presented or associated, may also be used to guide matching fragments of topologies to other fragments as will be discussed in more detail below in connection with stitching of application models to infrastructure templates.

With regard to capability policies, the nodes may define what kind of device they are, what versions of software they capable of, or are executing, and what they can do. An example, of a capability policy may include a definition associated with the node that defines it as an application server, that it provides a Java Platform, Enterprise Edition (J2EE) environment, that it runs a particular operating system, a version of an operating system, or a particular release of a version of the operating system, among many other capabilities. As described above, this may be used to determine, for example, what else may be deployed or what other devices may use the cloud services.

Another type of policy (303) that may be assigned includes monitoring policies. Monitoring policies are policies that, if implemented, define the operational monitoring of the nodes (302-1, 302-2, 302-3, 302-4, 302-5, 302-6, 302-7), the security monitoring of the nodes, the compliance monitoring of the nodes, analytics among the nodes and groups of nodes, usage monitoring of the nodes, performance monitoring, and intelligence monitoring such as, for example, collection of metrics, business intelligence (BI) and business activity monitoring (BAM) and analytics/big data integration, among other types monitoring-related policies.

The monitoring policies may also define what kind of monitoring is expected and how the monitoring is to be implemented. Examples of monitoring policies regarding node operations include performance, monitoring CPU levels and loads of the various nodes within the network, monitoring the speed at which data is processed through a node or a number of nodes or exchanged between nodes, and monitoring the operational state of applications running on a node or nodes at any level of the network, among many other operations parameters of the nodes, group of nodes, and the cloud service as a whole.

In another example, the monitoring policies also define how monitored events that occur in an instantiated topology are handled. In this example, the monitoring policies assist an event handler (316) in receiving and processing the events, and in making decisions regarding remediation of incidents resulting from the events, and in sending notification messages regarding the incidents. The handling of events within the topology-based management broker (200) will be described in more detail below. As will be described in more detail below, the monitoring policies include a portion that defines what to do with the monitored events that result from the monitoring such as, for example, how to handled the events, where the events are sent, what devices or individuals address the events, how incidents resulting from the processing of the events are handled, how the events and incidents are processed (e.g., processed as aggregated, filtered, or correlated events, among other forms of processing), and how the resulting incidents are handled.

Monitoring policies also include monitoring policies regarding security. Security policies define how to monitor for abnormal behaviors or behaviors known as being associated with known or suspected security issues. Examples of monitoring policies regarding security include monitoring whether a node or a group of nodes is experiencing an attack, whether there is strange behavior occurring within the cloud service or interactions with the cloud service, and whether there is a virus or other anomaly with a node or group of nodes, among other security-related monitoring policies.

Monitoring policies also include monitoring policies regarding compliance. Examples of monitoring policies regarding compliance include, determinations as to whether the nodes or group of nodes are running an appropriate version of an operating system, determining whether the most recent patch associated with the release of a software program running on the nodes has been installed, determining if an installed patch is a correct patch, checking that a code or artifacts that have been used to provision the node and cloud service have been appropriately checked and vetted for any weakness or problem, if governance and access control to the node and cloud service or the node and cloud service management is appropriate, and if settings of a provisioned system match provisioning, security, or other compliance requirements such as correct logging levels, correct setup for access controls, and correct setup for passwords, among other compliance-related monitoring policies.

Monitoring policies also include monitoring policies regarding usage. Examples of monitoring policies regarding usage include, determining how much a user has been using CPUs of a node or group of nodes, determining how much memory a user has utilized, determining how much money has been charged to the user, and determining whether the user has paid for the services provide through the designing, provisioning, deploying, and monitoring of the network topology, among other usage-related monitoring policies.

The policies (303) may further comprise governance policies that, if implemented, define access controls of nodes (302-1, 302-2, 302-3, 302-4, 302-5, 302-6, 302-7) or groups of nodes within the topology (302) or the cloud service. For example, governance policies may include policies that define who may access the nodes within the topology (302) or the cloud service, and under what conditions may those individuals obtain such access.

The policies (303) may further comprise analytics policies that, if implemented, define what is needed to ensure analytics and big data monitoring within or among the nodes (302-1, 302-2, 302-3, 302-4, 302-5, 302-6, 302-7) or groups of nodes within the topology (302), and ensure that this is occurring as expected. For example, the analytics policies may define a number of workflows by which the monitoring system (313) may operate to configure the cloud service, provide analytics, collect big data, and process the data.

Still further, the policies (303) may comprise remediation policies that define what actions are to take place within the topology (302) should a problem arise or an incident be raised during deployment and execution of the topology (302). Remediation policies may include policies that define a number of actions taken by the topology-based management broker (200) during remediation processes, and include: (1) providing notifications to a user, consumer, or administrator; (2) obtaining instructions from the user, consumer, or administrator; (3) taking manual actions input by the user, consumer, or administrator; (4) taking autonomous actions after receiving instructions from the user, consumer, or administrator; (5) taking autonomous actions without receiving instructions from the user, consumer, or administrator; (6) taking autonomous actions without notifying the user, consumer, or administrator or receiving instructions from the user, consumer, or administrator; (7) proposing a remediation action to a user or administrator for approval, and performing the proposed remediation action if approved by the user or administrator, or combinations thereof.

As an example, a failure of the cloud service as instantiated or realized by the topology (302) may occur, and the remediation policies may define how that failure may be handled based on the above potential scenarios. In addition, the remediation policies provide the actual rules and workflows of actions to perform to remediate the incidents under any number of conditions or indicate to whom or which device to delegate the decision making and orchestration and fulfillment of these remediation actions. Another remediation example may regard a potential need to maintain a level of service based on, for example, a service level agreement (SLA), or a quality of service (QoS) within the cloud service that is realized based on the topology (302). In this example, the addition of resources to support the increase in demand for resources may be handled based on the above potential scenarios. More details regarding monitoring of the deployed topology and event handling therein will be described in more detail below.

As described above, the nodes (302-1, 302-2, 302-3, 302-4, 302-5, 302-6, 302-7) may include a number of lifecycle management actions (LCMA) (304) associated with the nodes (302-1, 302-2, 302-3, 302-4, 302-5, 302-6, 302-7). The LCMAs (304) are a number of actions associated with the policies (303) that are executed by a processor when triggered by the policies (303) within a cloud service environment in which the topology (302) is implemented. The LCMAs may be associated with and operable against a number of individual nodes, a number of groups of nodes, a number of nodes of a class of nodes, a subset of the nodes within the entire topology of the cloud service; the entire topology of the cloud service as a whole, or combinations thereof. If the LCMAs are executed with respect to the individual nodes, groups of nodes, or the entire topology of the cloud services as a whole, the LCMAs will take an action with respect to the individual nodes, groups of nodes, the nodes of a class of nodes, a subset of the nodes within the entire topology of the cloud service, or the entire topology of the cloud service as a whole as defined within the LCMAs. LCMAs (304) include actions such as, for example, provisioning of computing resources within the topology, updating the topology, copying all or portions of the topology, modifying computing resources within the topology, moving computing resources within the topology, destroying or deleting resources within the topology, among other lifecycle management actions.

The various policies described herein define what actions are to be performed throughout the lifecycle of the topology (302) before, during, and after instantiation of a service based on the topology (302). Further, the various policies described herein define how these actions are to be performed. Still further, the various policies described herein define which device, individual, or combination thereof to which the actions are to be delegated. Even still further, the various policies described herein define combinations of the above. For example, any of the monitoring policies used in event handling and processing, or remediation may define what devices or portions of the cloud service are to be monitored or remediated, how to execute such monitoring and remediation, to whom or what devices to delegate the roles of monitoring and remediation, or a combination thereof.

Different policies play different roles at different times within the lifecycle of a topology. Further, the different policies may be executed at different times of the lifecycle of the cloud service and throughout the flows of the topology-based management broker (200). FIG. 4 is a block diagram of an execution flow of the execution of a topology (302) using provisioning policies, according to one example of the principles described herein. In the example of provisioning policies with their number of capabilities and requirements, a topology (302) may be designed with a number of associated policies (303) as described above. As depicted in FIG. 4, the topology (302) with its associated policies (303) may be an input (401) to a policy provisioning engine (402). In one example, the topology (302) may be an architecture based topology. In another example, the topology (302) is a generic topology. A generic topology is any graphical representation comprising a number of nodes with associated policies and LCMAs. The policies and LCMAs may be associated with the generic topology via, for example, a resource provider which provides a number of resources for an instantiated service based on the generic topology. The generic topology, as will be described in more detail below, may be executed by walking the generic topology to obtain executable logic. The executable logic is then executed to instantiate a service.

The policy provisioning engine (402) may be a stand alone device or incorporated into a device of FIG. 1A such as, for example, the resource offering manager (308). The policy provisioning engine (402) may obtain a number of provisioning policies from a resource provider called resource provider policies (PR) (308-1), a number of provisioning policies as defined by a user, a number of policies as defined by the topology designer (301), or combinations thereof. In another example, resource provider policies (308-1) may be provided at block 411 where a number of monitoring, event handling, and remediation policies are added as will be described in more detail below.

Resource provider policies (308-1) may be any policies that associated with a number of resource providers' offerings that guide the selection of a number of resources. In one example, the resource provider policies (308-1) may be dynamic functions that define the computing abilities of a computing resource. In this example, a computing resource that provides a defined level of computing resources such as, for example, processing power may be provisioned by the LCM engine (311) and resource offering manager (308) if the defined level of that computing resource meets a number of requirements within the topology (302).

Further, in one example, the addition of a policy (303, 308-1) to the topology or portions thereof may cause the design of the topology to change. In this example, a policy (303, 308-1) added to an element of the topology (302) may effect a number of other policies (303, 308-1). For example, associating with a topology (302) a policy that indicates that a node be highly available may evolve the policies (303) and topology (302) as a whole to require, for example, a cluster of nodes. In this manner, policies may drive the design of the topology (302).

Accordingly, a designed topology such as, for example, an architecture topology generated, for example, by an automated or manual matching process with policies and LCMAs associated with the nodes of the topology (302) is modified at the time of provisioning. This may be performed by executing, with the provisioning policy engine (402) or the resource offering manager (308), the provisioning policies to determine a topology that satisfies the provisioning policies perfectly or in the best obtainable manner. Obtaining a best fit topology may involve a number of resource provider policies (308-1) provided by the resource offering manager (308) which describe the capabilities and selection criteria of a resource provider. The resource offering manager (308) selects, for example, the resource provider from which the resource is to be obtained, and may also make other modifications to the topology (302).

At block 411, a number of monitoring, event handling, and remediation policies may also be added to support a number of additional topology systems such as, for example, the monitoring system (313), the event handler (316), and the remediation engine (317). These additional policies (411) will then be used to define how these additional topology systems (313, 316, 317) are provisioned, deployed, and utilized within the to-be-instantiated service. Thus, as depicted in FIGS. 3A, 3B, and 4, these additional policies (411) provide for not only the initial provisioning and deployment of any type of additional topology system (313, 316, 317), but will also be executed post-provisioning to provide for services supporting the instantiated service.

In one example, context (410) in which a service is to be instantiated may be used by the policies associated with the topology (302) to make a number of policy decisions. Examples of context may include the current load on a system or instantiated service, the identity of a user of the instantiated service, the time of year in which the service is to be instantiated or modified, among other types of contexts in which the present systems and methods are employed. The context may then be used to make policy decisions. For example, in the case of the current load on a system or instantiated service, the policies associated with the topology (302) may cause one or more policy decisions to be made such as, for example, the scaling in or out of the instantiated service. Thus, the context (410) is used by the policies to make policy decisions. Context (410) may be provided to the provisioning policy engine (402) and/or at block 411 where a number of monitoring, event handling, and remediation policies are added.

As depicted in the examples of FIGS. 1 and 2, blueprints are arranged in the form of execution scripts. This arrangement is similar to the manner in which HEAT command language interpreter arranges scripts. HEAT command language interpreter is an open source software developed and distributed by the OpenStack Foundation and released under the terms of the Apache License. Although HEAT may assist in the creation of a set of scripts fitting in the space of the execution plan, HEAT may provide support by interpreting or translating data, and converting the data into scripts. The present systems and methods may add the policies (303) and LCMAs (304) to the HEAT interpreter, and execute as described above. The execution of architecture-derived topologies are performed differently as will be described in more detail. However, both blueprints and various forms of topologies described herein may be executed via the same LCM engine. As described herein in connection with FIGS. 3A and 3B, the present systems and methods support all the use cases described herein.

The topology (302) is modified per the received provisioning policies (308-1) by the provisioning policy engine (402) as indicated by arrow 407, and sent to an interpreter (403). The interpreter (403) is any hardware device or a combination of hardware and software that interprets the provisioning policies to create an execution plan as indicted by arrow 408. The result is then interpreted and converted into an execution plan (408) that comprises a workflow or sequence of serial and/or parallel scripts in order to create an instance of the topology (FIG. 1A, 312). In one example, the interpreter (403) is a stand alone device or is contained within the LCM engine (FIG. 1A, 311). The execution plan (408) comprises a number of workflows or sequences of serial and/or parallel scripts. The topology LCM engine (311) obtains the workflows or sequences of serial and/or parallel scripts, calls a resource provider via the resource offering manager (308) as indicated by arrow 409, and creates an instantiated service (312) at block 405. Assuming the workflow or sequence of serial and/or parallel scripts is executable, which it should be in the case of an architecture descriptive topology, the actions associated with the workflow or sequence of serial and/or parallel scripts are executed by the LCM engine (311).

With the above-described sequence based topology, an execution plan (408) may be represented as a blueprint. Conversely, a blueprint may be expressed as an execution plan (408). A blueprint with nodes expanded by policies (303) and LCMAs (304) may be similarly processed, instead, in a manner similar to the processing of an infrastructure topology. In this example, the blueprint in the form of a sequential service design (406) is input to the interpreter for processing as described above in connection with FIG. 4.

The execution of the execution plan (408) by the topology life cycle management engine (311) results in an instantiation of the cloud services including the provisioning of devices for monitoring, event handling, and processing and remediation of events and incidents as will be described in more detail below. The result of the topology life cycle management engine (311) executing the workflow or sequence of serial and/or parallel scripts as defined by the execution plan (408) is an instantiated service (312) as indicated by block 405. Further, a realized topology (314) may be created based on the instantiated service (312), and stored as will also be described in more detail below.

Figure 5:
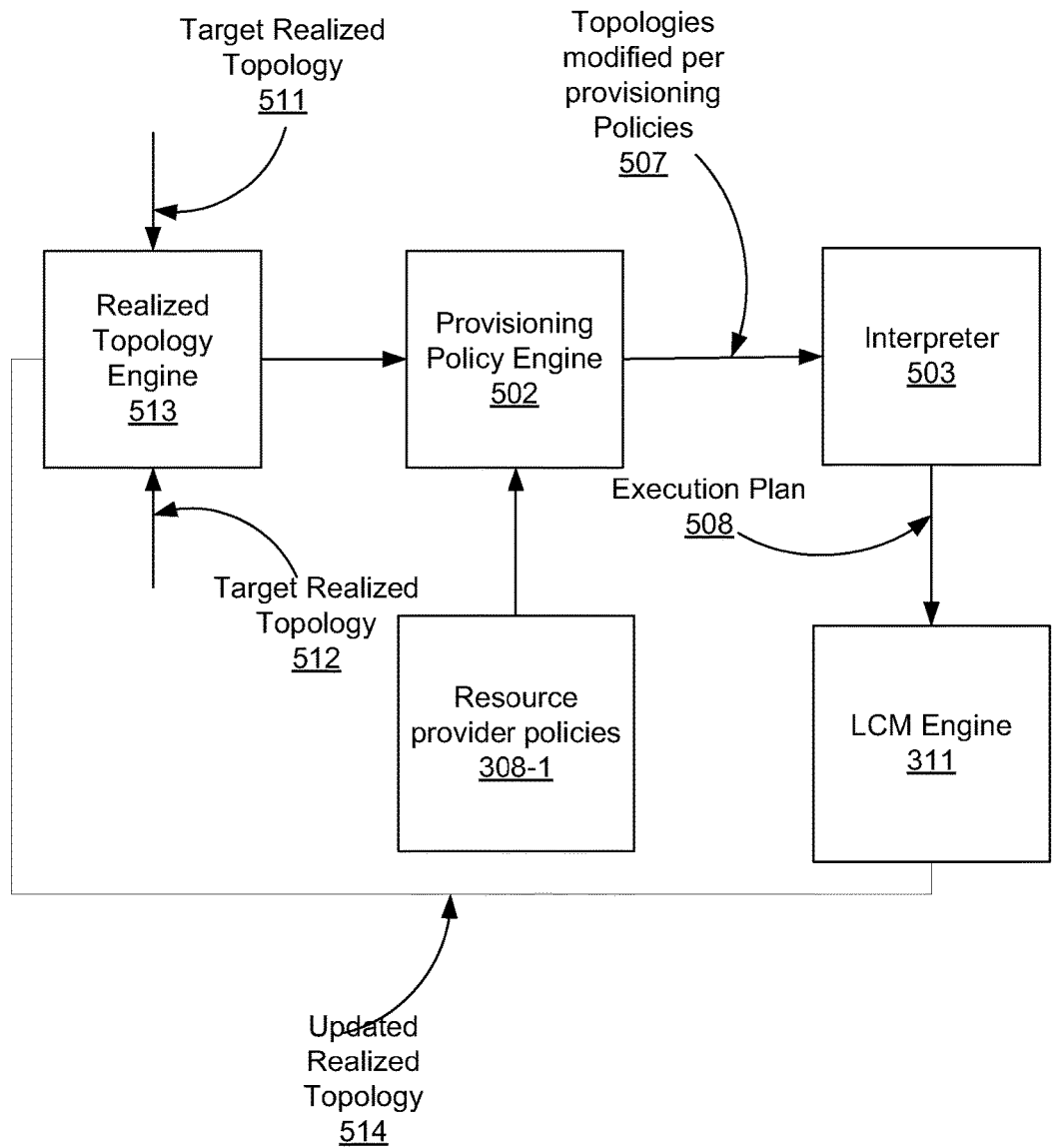
FIG. 5 is a block diagram of an execution flow of the execution of a realized topology using provisioning policies, according to one example of the principles described herein.

As a result of initial execution as described herein in connection with FIGS. 3A, 3B, and 4, a realized topology (314) is created based on the instantiated service (312). Throughout the lifecycle of the instantiated service (312), any requested modification to the instantiated service (312) or any type of additional topology system (313, 316, 317) can be executed. The use of a realized topology (314) in this manner will now be described in connection with FIG. 5. FIG. 5 is a block diagram of an execution flow of the execution of a realized topology using provisioning policies, according to one example of the principles described herein. In this example, the application may be described as a realized topology, after which the application is self-managing. As depicted in FIG. 5, a realized topology (511) or other desired or target realized topology (512) may be input into a realized topology engine (513). The realized topology engine (513) may be a stand alone device or incorporated into a device of FIGS. 3A and/or 3B. Similarly, as depicted in FIG. 5, the realized topology (and corresponding topology changes received from the LCM engine (311)) may be an input into a provisioning policy engine (502). The policy provisioning engine (502) may obtain a number of provisioning policies from a resource provider called resource provider policies (PR) (308-1), a number of provisioning policies as defined by a user, a number of policies as defined by the topology designer (301), or combinations thereof.

Resource provider policies (308-1) may be any policies that are associated with a number of resource providers' offerings that guide the selection of a number of resources. In one example, the resource provider policies (308-1) may be dynamic functions that define the computing abilities of a computing resource. In this example, a computing resource that provides a defined level of computing resources such as, for example, processing power may be provisioned by the LCM engine (311) and resource offering manager (308) if the defined level of that computing resource meets a number of requirements within the topology (302).

In some examples, a realized topology is modified at the time of provisioning. This may be performed by executing, with the provisioning policy engine (502) or the resource offering manager (308), the provisioning policies to determine a topology that satisfies the provisioning policies perfectly or in the best obtainable manner. Obtaining a best fit topology may involve a number of resource provider policies (308-1) provided by the resource offering manager (308) which describe the capabilities and selection criteria of a resource provider. The resource offering manager (308) selects, for example, the resource provider from which the resource is to be obtained, and may also make other modifications to the topology (302).

The topology (302) is modified per the received provisioning policies (308-1) by the provisioning policy engine (502) as indicated by arrow 507, and sent to an interpreter (503). The interpreter (503) is any hardware device or a combination of hardware and software that interprets the provisioning policies to create an execution plan as indicted by arrow 508. In some examples, the execution plan (508) may include an indication as to whether the application is self-managing or auto-managing. For example, the execution plan (508) may include code within the application that carries out provisioning, remediation, event handling, or combinations thereof. Alternatively, the execution plan (508) may provision, remediate, handle events, or combinations thereof based on policies.

The result is then interpreted and converted into an execution plan (508) that comprises a workflow or sequence of serial and/or parallel scripts in order to create an instance of the topology (FIG. 1A, 312). In one example, the interpreter (503) is a stand alone device or is contained within the LCM engine (FIG. 1A, 311). The execution plan (508) comprises a number of workflows or sequences of serial and/or parallel scripts. In some examples, the execution plan (508) may modify, retire or instantiate a new instance.

The execution of the execution plan (508) by the topology life cycle management engine (311) results in an instantiation of the cloud services including the provisioning of devices for monitoring, event handling, and processing and remediation of events and incidents as will be described in more detail below. The topology LCM engine (311) may update a realized topology with policies and LCMAs as indicated by the arrow (514), which may be passed to the realized topology engine (513) to update a realized topology based on the policies and updates.

As to the monitoring and remediation policies described herein, the same type of process may be applied, but with a number of realized policies defined within an instantiated service (312) and its realized topology (314) as input. In this process, additional LCMAs (304) may be created and used to assist in provisioning resources in an updated instantiated service (312). The explanation below across CSA/CDA use cases with architecture topologies or with blueprints shows the notion of common engine, pattern, and platform across all these cases.

The present systems and methods may be used in conjunction with any third party modeling such as, for example, HEAT command language interpreter that is an open source software developed and distributed by the OpenStack Foundation and released under the terms of the Apache License. Although HEAT may assist in the creation of a set of scripts fitting in the space of the execution plan, HEAT may provide support by interpreting or translating data, and converting the data into scripts. The present systems and methods may add the policies (303) and LCMAs (304) to the HEAT interpreter, and execute as described above.

Further, the present systems and methods may use topology and orchestration OASIS specification for cloud applications (TOSCA), a cloud computing standard to express topologies. In this example, the policies (303) and LCMAs (304) are added to a TOSCA-based topology.

Thus, the policies (303) and the LCMAs (304) may be implemented as function calls (305) or scripts in order to provision and deploy the topology (302) when the policies (303) and the LCMAs (304) trigger such provisioning and deployment. A resource offering manager (308) may be provided within the topology-based management broker (200) to manage and provide computing resources within the topology (302) based on the policies (302) and LCMAs (304).

The resource offering manager (308) provides a number of plug-ins to execute the life cycle manager (311). As described above, the resource offering manager (308) associates a number of resource policies (308-1) to the plug-ins of a number of resource providers so that the resource providers may assist in guiding the selection process of a number of the resource providers. The non-resource provider policies such as policies (103) associated to the nodes are different in that they are associated with the nodes (302-1, 302-2, 302-3, 302-4, 302-5, 302-6, 302-7) during the designing of a topology (302).

The resource offering manager (308) may be operated by, for example, an administrator, or a service provider in order to provision the resources within the cloud service to be created via the deployment of the topology (302). As discussed above, the resource offering manager (308) comprises the hardware and software to define a number of resource provider policies (308-1), associate a number of those resource provider policies (308-1) with a number of the nodes (302-1, 302-2, 302-3, 302-4, 302-5, 302-6, 302-7), the topology (302), or portions of the topology (302). When the topology (302) is deployed, the resource offering manager (308) provides the computing resources to the user that will implement the topology (302) based on the policies (303), the LCMAs (304), and the resource provider policies (308-1). As a result, the LCMAs are functions of the policies (303) associated with the topology (302), and the resource provider policies (308-1).

Thus, in one example, the resource offering manager (308) may implement a number of resource provider policies (308-1) that define under which conditions a computing resource from a number of service providers may be selected for deployment within the topology (302). In this example, the policies (303) associated with a node as well as the resource provider policies (308-1) define which resource offering from the resource offering manager (308) is selected for provisioning within the to-be-deployed instantiated topology (312). For example, if a policy associated with node (302-1) requires that the provisioned computing resource be located in a secure facility, and the policies of the resources offered by the resource offering manager (308) indicate that those available computing resources are not located in a secure facility, then that non-secure computing resource provided by that particular service provider will not be selected. In this manner, the policies associated with the nodes (302-1, 302-2, 302-3, 302-4, 302-5, 302-6, 302-7) and the policies associated with the resource offering manager (308) determine which computing resources may be provisioned and deployed within the topology (302).

The topology-based management broker (200) may store the topology (302) in a catalog (310). In one example, the topologies (302) designed and stored in the catalog (310) may be made available to any interested party via a self-service portal (309). In another example, an application program interface (API) may be provided instead of or in addition to the self-service portal (309). In this example, the API may be used by an application executing within the topology-based management broker (200) which may make a request from the catalog (310) for a number of topologies (302).

In another example, the user may be given the opportunity to view the catalog (310) of stored topologies to obtain a topology that was created for a first user or organization, and use a number of those topologies as the user's topology by ordering or subscribing to a topology (302). In still another example, the user may be given the opportunity to view the catalog (310) of stored topologies to obtain a topology that was created for a first user or organization, obtain a number of those topologies, and add a number of other topologies to it such as in an example where an application model is built on an infrastructure template using stitching processes described below.

In still another example, the user may be given the opportunity to view the catalog (310) of stored topologies to obtain topologies that were created for a first user or organization, obtain a number of those topologies, and add a number of other topologies to it such as topologies designed de novo or stored within the catalog (310). In still another example, the user may be given the opportunity to view the catalog (310) of stored topologies to obtain topologies that were created for a first user or organization, obtain a number of those topologies, and build a new cloud service that comprises aspects of all the predefined topologies and the respective services described by the pre-defined topologies.

In another example, the user, a service designer, or a combination thereof may design the topology anew, design a topology based on a topology stored in the catalog (310), or design a topology based partially on a topology stored in the catalog (310). Design of a topology (302) may be split among a number of users, designers, and administrators. The designing of the topology (302) may include separating the design of the topology into a number of topologies and attaching to the separate pieces of the individual topologies and the topology as a whole a number of properties, LCMAs, and policies. The user may also order a desired topology, be given an opportunity to approve of the chosen topology, and view and operate the topology by executing a number of applications on the resultant cloud service.

In another example, an application program interface (API) may be made available that invokes the call functions associated with the desired topology (302). In the self-service portal (309) example, the catalog (310) may be made available to the user, may identify to the user the item or items associated with the desired topology (302), may provide the ability for the user to order a number of services, and provide for the deployment of the selected topology (302). In one example, the deployment of the topology (302) may be approved by the user or a manager as defined by an approval workflow before deployment based on, for example, a service level agreement (SLA), cost of the cloud services, and the policies, among other considerations. In still another example, once the topologies (302) are designed and stored in the catalog (310), the topologies (302) may be identified by commercial terms and associated descriptions of how the topology (302) may be used.

When a topology (302) has been designed, the topology (302) may be provisioned on behalf of the user to create a subscription within the SLA. The topology lifecycle management (LCM) engine (311) is a data processing device that will execute the topology (302) to provision and deploy computing resources to form the cloud service for use by the user. The topology LCM engine (311) analyzes the topology (302) created, and creates a set of scripts that form execution logic in the form of the execution plan to instantiate and realize the topology (302). In one example, the set of scripts define a sequence of provisioning and deployment of computing resources. The topology LCM engine (311) applies the policies associated with the topology (302) and the nodes (302-1, 302-2, 302-3, 302-4, 302-5, 302-6, 302-7) of the topology (302) as well as the policies set for the resources managed by the resource offering manager (308).

As a result of the above systems and methods, an instantiated service (312) is provided to the user for use. The instantiated service (312) comprises a number of computing devices that match the designed topology (302) and the nodes (302-1, 302-2, 302-3, 302-4, 302-5, 302-6, 302-7) within the topology (302). The instantiated service (312) functions based on the policies described above. The computing devices that make up the instantiated service (312) may comprise, for example, servers, switches, client devices, and databases, among many other computing devices. A realized topology (314) is derived by the LCM engine (311) or other device based on the instantiated service (312).

In addition to the instantiated service (312), a monitoring system (313) is also deployed if not already existent, or setup and configured if already available in order to monitor the instantiated service (312). With the inclusion of a monitoring system (313) within the topology-based management broker (200), the topology-based management broker (200) provides for a converged management and security (CM&S) environment. In one example, the CM&S environment may be the CM&S environment developed and distributed by Hewlett Packard Corporation. In another example, the CM&S environment may be the CM&S environment described in International Patent App. Pub. No. PCT/US2012/059209, entitled "Hybrid Cloud Environment" to Maes et al., which is hereby incorporated by reference in its entirety. The CM&S environment provides for template- and model-based approaches to application and service development and deployment, with the ability to bind management and security capabilities to service models at deployment time in order to ensure common capabilities across hybrid cloud environments. CM&S also provides portability across private and public cloud environments, which may include heterogeneous infrastructures, management, and security tools. Further, CM&S provides efficient delivery and management of the application release, whether the infrastructure resources are on premise, in the public cloud or in a hybrid environment across public and private clouds. CM&S also provides role-based, predictive, and real-time performance and risk insights, and analytics such as, Business Intelligence (BI), Business Activity Monitoring (BAM), and big data analyses across heterogeneous systems, networks, and cloud environments.

In one example, the monitoring system (313) operates based on the monitoring policies associated with the topology (302) and the nodes (302-1, 302-2, 302-3, 302-4, 302-5, 302-6, 302-7) of the topology (302) as described above. In this example, the monitoring system (313) is used to monitor the operations, the security, the compliance, and the usage of the topology (302) and the nodes (302-1, 302-2, 302-3, 302-4, 302-5, 302-6, 302-7) of the topology (302), among other items to monitor within the instantiated service (312).

In one example, the monitoring system (313) is deployed to monitor the instantiated service (312) in cases where the monitoring system (313) already exists. In this example, a number of existing monitoring devices may be used to monitor the instantiated service (312) autonomously, through human intervention, or a combination thereof by configuring the existing monitoring system (313) to match the monitoring policies defined when designing the topology (302). In this example, the monitoring system (313) already existent may be configured based on the monitoring policies associated with the topology (302) and the nodes (302-1, 302-2, 302-3, 302-4, 302-5, 302-6, 302-7) of the topology (302) as described above, configured based on input from a user, or combinations thereof.

In another example, a previously non-existent monitoring system (313) may be provisioned and deployed based on the monitoring policies defined when designing the topology (302). In this example, the monitoring system (313) is provisioned and deployed at the same time as the provisioning and deployment of the instantiated service (312). Further, the monitoring system (313), in this example, is deployed and managed based on the monitoring policies associated with the topology (302) and the nodes (302-1, 302-2, 302-3, 302-4, 302-5, 302-6, 302-7) of the topology (302) as described above. In any of the above examples, a complete service as outlined by the topology (302) is created, including the instantiated system (312) and the monitoring system (313).

The topology-based management broker (200) further comprises a realized topology system management (RTSM) database (315). The RTSM database (315) is a logical system repository of realized topologies (314), and may be any form of data repository. In one example, the RTSM database (315) comprises a database management system (DBMS). The DBMS is a combination of hardware devices and software modules that interact with a user, other applications, and the database itself to capture and analyze data. In one example, the RTSM database (315) is a configuration management database (CMDB). A CMDB is a repository of information related to all the components of a realize topology (314).

The DBMS of the RTSM database (315) is designed to allow the definition, creation, querying, update, and administration of a database of realized topologies (314). Realized topologies are a model of the topologies (302) with the policies described above associated therewith. Thus, the realized topology (314) comprises a model of the topology (302), with the policies applied to the various nodes (302-1, 302-2, 302-3, 302-4, 302-5, 302-6, 302-7). A number of properties of the nodes (302-1, 302-2, 302-3, 302-4, 302-5, 302-6, 302-7) of the realized topology (314) are defined within the realized topology (314). These properties include any details of any instantiated service (312) that is created or updated via the topology-based management broker (200), and may include, for example, the internet protocol (IP) address of the nodes, and characteristics and computing parameters of the nodes, among many other properties.

The RTSM (315) is a repository that stores each instance of a realized topology (314). In this manner, every time a topology (302) is designed, provisioned, and deployed, the topology-based management broker (200) captures the realized topology (314) of that topology (302). Thus, the RTSM (315) contains a realized topology (314) of every topology (302) that has been instantiated within the topology-based management broker (200) or, through the below-described remediation processes, stores a modification of a realized topology or an instantiated service (312). Thus, in one example, in every instance of the modification of an existing topology (302), the realized topology (314) resulting from that modification is also stored within the RTSM (315). The remediation processes will now be described in more detail.

As may happen within the topology-based management broker (200), a number of events may occur within the topology-based management broker (200). These events may include, for example, a policy failure within a node of the instantiated service (312), a failure of one or more hardware or software components within the instantiated service (312), and an unauthorized access of the instantiated service (312), among many other computing-related events. Further, the monitoring system (313) monitors a number of performance- and utilization-related events that may occur within the instantiated service (312). These performance- and utilization-related events may include, for example, processor utilization within a number of the nodes, utilization of a number of the nodes by, for example, customers of the user's business, and levels of remaining data storage space within a data storage device, among many other performance- and utilization-related events.

In one example, the monitoring system (313) informs the event handler (316) of any events detected by the monitoring system (313). The event handler (316) is any computing device that receives data associated with detected events from the monitoring system (313), and processes the data in order to create a number of incidents that may arise from the detected events.

Thus, the topology-based management broker (200) processes the events that are detected by the monitoring system (313). Processing of events detected by the monitoring system (313) may be performed by the event handler (316). The event handler (316) may receive any kind or amount of data from the monitoring system (313). As described above, the data received from the monitoring system (313) by the event handler (316) may include any data associated with the operation and usage of the instantiated service (312) as a whole, and the nodes (302-1, 302-2, 302-3, 302-4, 302-5, 302-6, 302-7) within the instantiated service (312) as groups of nodes and as individual nodes. In one example, the event handler (316) performs a number of requests for the event data. In this example, the event handler (316) may poll the monitoring system (313) for the event data after a predefined time period, randomly, when triggered by another event, or a combination thereof. As described above, event handling and processing may, in one example, be delegated to another system or third party service. For example, event handling such as correlation and filtering of events and incidents and incident identification may be delegated to HP BUSINESS SERVICE MANAGEMENT; a suite of service management software tools developed and distributed by the Hewlett Packard Corporation. Remediation processes may be delegated to HP OPERATIONS MANAGER I (HP OMi) or SITESCOPE; both comprising a suite of software tools developed and distributed by the Hewlett Packard Corporation. Security event notification, processing, and remediation may be delegated to HP ARCSIGHT; a suite of service management software tools developed and distributed by the Hewlett Packard Corporation. In one example, HP ARCSIGHT may reference the service agreement (SA) associated with the instantiated service (312) to comply with the SA.

The data received from the monitoring system (313) is processed by the event handler (316), and the event handler (316) determines whether an event requires a remediation action, and whether and how to present a notification of the event to a user, administrator, third party, or other user of the topology-based management broker (200) or instantiated service (312). If the event handler (316) determines that a remediation action is to be taken in connection with an event, the event handler (316) generates an incident based on the event, and the data associated with the event is sent to a remediation engine (317). In one example, the event handler (316) may process the events received from the monitoring system (313) using a number of processing types. Types of processing that the event handler (316) may perform include filtering, correlation, and aggregation of the events, among other forms of event processing, and combinations thereof. In one example, a number of events may collectively be subjected to a number of forms of event processing in order to create an incident. In this example, the events may individually not support the creation of an incident that requires remediation, but a number of events, when analyzed by the event handler (316), may indicate that an issue within the instantiated topology (312) is not in agreement with the policies (303), or is otherwise in need of remediation.

In another example, incidents may be identified from a number of ticket support systems. For example, an information technology (IT) service management system (ITSM) (316-1) may also be a source of incidents. An ITSM system (316-1) implements and manages the quality of IT services that meet the needs of the user. In one example, the ITSM system (316-1) is managed by the user, a service provider, a third party, or combinations thereof, in which a service ticket is opened by one of these groups or individuals. In another example, the ITSM system (316-1) may automatically enter a service ticket based on the events detected by the monitoring system. If the ITSM system (316-1) determines that the instantiated system (312) or a number of nodes (302-1, 302-2, 302-3, 302-4, 302-5, 302-6, 302-7) thereof are not appropriately provisioned, are wrongly provisioned, or are otherwise unfit for the instantiated system (312), the ITSM system (316-1) may, like the event handler (316), provide a remediation determination in the form of an incident sent to the remediation engine (317).

The incidents generated by the event handler (316) and the ITSM system (316-1) may be brought to the attention of a user, administrator, third party, or other user of the topology-based management broker (200) or instantiated service (312) in the form of a notification. As described above, the remediation policies define how a remediation action is to be performed, and may include: (1) providing notifications to a user, consumer, or administrator; (2) obtaining instructions from the user, consumer, or administrator; (3) taking manual actions input by the user, consumer, or administrator; (4) taking autonomous actions after receiving instructions from the user, consumer, or administrator; (5) taking autonomous actions without receiving instructions from the user, consumer, or administrator; (6) taking autonomous actions without notifying the user, consumer, or administrator or receiving instructions from the user, consumer, or administrator; or combinations thereof. In this manner, the issuance of notifications within the system is defined by the remediation policies.

The remediation engine (317) executes, via a processor, logic to correct the incidents reported by the event handler (316) and/or ITSM system (316-1). Remedies issued by the remediation engine (317) may include, for example, allocation of additional computing resources, allocation of different computing resources, and reallocation of computing resources from one geographical area to another, among many other remediation actions. In one example, the remediation actions taken by the remediation engine (317) are implemented to remedy a misallocation of computing resources that does not comply with the policies associated with the topology (302) designed. In another example, the remediation actions taken by the remediation engine (317) are implemented to remedy a failure of a number of computing resources within the instantiated service (312). In still another example, the remediation actions taken by the remediation engine (317) are implemented to adjust the security levels of the instantiated service (312) and the groups and individual computing resources therein. Any number of other remediation actions may be implemented by the remediation engine (317) for any number of reasons.

In one example, the remediation actions taken by the remediation engine (317) are implemented with or without notification to a user, administrator, third party, or other user as described above. Further, in another example, the remediation actions taken by the remediation engine (317) are implemented autonomously, without user interaction or confirmation from a user.

In still another example, the remediation actions taken by the remediation engine (317) are implemented with user interaction from the consumer, administrator, third party, or other user. In this example, the remediation engine (317) sends data to a self-service subscription management engine (318). The self-service subscription management engine (318) executes, via a processor, logic to present information to a user regarding the events detected by the monitoring system (313) and the incidents generated by the event handler (316) and ITSM system (316-1). The self-service subscription management engine (318) also executes, via a processor, logic to present to a user a number of recommendations for remediation of the events and incidents.

In one example, the self-service subscription management engine (318) executes, via a processor, logic to present a number of graphical user interfaces (GUIs) (318-1) to a user. In this example, the GUIs (318-1) allow a user to view the realized topology (314), and the events detected by the monitoring system (313) and the incidents generated by the event handler (316) and ITSM system (316-1). In this manner, the user is able to identify the problems within the realized topology (314) via the GUIs (318-1) produced by the self-service subscription management engine (318). Further, the GUIs (318-1) allow the user to select a recommended remediation action and define how the remediation action may be executed.

In another example, the self-service subscription management engine (318) may execute, via a processor, an API to provide to a user a number of indicators within a representation of the realized topology (314) that represent the problem within the realized topology (314) paired with information regarding the problem and which nodes (302-1, 302-2, 302-3, 302-4, 302-5, 302-6, 302-7) in the realized topology (314) the problem is associated with.

When the remediation engine (317) executes its logic to correct the incidents reported by the event handler (316) and ITSM system (316-1), and/or when a user, via the self-service subscription management engine (318), selects a remediation action to be taken, the topology-based management broker (200) executes a number of calls to a number of lifecycle management actions (LCMAs) to remediate the incidents. LCMAs may include, for example, duplication, moving, copying, or killing of a number of computing resources including all or portions of the realized topology (314), among other LCMAs.

The topology LCM engine (311) executes a new topology (302) created through the remediation processes to provision and deploy computing resources to form a new instantiated service (312). Thus, the topology LCM engine (311) iteratively applies the LCMAs received from the self-service subscription management engine (318) and the remediation engine (317) to the realized topology (314) to create the new and subsequent instantiated service (312).

The remediation processes comprises all of the functionality of the monitoring system (313), the event handler (316), the ITSM system (316-1), the remediation engine (317), the self-service subscription management engine (318), the topology LCM engine (311), and combinations thereof. Any number of iterations of this remediation process may be applied to successive realized topologies (314) to create successively new instantiated services (312). In this manner, the new instantiated service (312) will comprise a number of computing resources that match the designed topology (302) as well as the changes made by the executed LCMAs via the remediation process. Thus, the topology-based management broker (200), with the topology LCM engine (311), derives a new and subsequent realized topology from the new and subsequent instantiated service (312), and stores the subsequent realized topology in the RTSM (315).

Based on the above, the topology-based management broker (200) is able to provision, deploy, and maintain an instantiated service (312) autonomously with or without user interaction. Thus, in this manner, a number of applications being executed on the instantiated service (312) are able to be self-executing on the instantiated service (312) by, for example, calling an API.

As described above, the structures of blueprints (100) are difficult to use as models of applications or templates of infrastructures as CONTINUOUS DELIVERY AUTOMATION (CDA) does. CDA is system tool utilized within a topology designer that independently models infrastructure and application requirements while managing versions, configurations, and other application components. CDA 1.2 is also developed and distributed by Hewlett Packard Corporation. The structures of blueprints (100), for the same reason given above, are difficult to use as models of applications because blueprints do not describe the architecture of the application. Further, blueprints are difficult to use as templates of an infrastructure because they also do not describe the architecture of the infrastructure. As a result, systems aiming at modeling application models and infrastructure or platform templates, and mapping the application models and infrastructure or platform templates to each other are not easily reconciled with the blueprints because they are based on different methods of modeling these services. The reconciliation between the models of a number of applications executed on the deployed service with the infrastructure templates of the service will now be described.

As depicted in FIG. 3B, the topology-based management broker (200) further comprises a subsystem capable of independently modeling infrastructure and application requirements of a topology on the same stack as the subsystem depicted in FIG. 3A. However, as described above, the present systems and associated methods also support all the use cases that a CDA supports such as those CDA 1.2 supports. As described above, CDA is a number of software tools utilized within a topology designer that independently model infrastructure and application requirements while managing versions, configurations, and other application components. CDA 1.2 is also developed and distributed by Hewlett Packard Corporation.

The subsystem of the topology-based management broker (200) depicted in FIG. 3B may be used to design a topology for a number of applications to be executed on the instantiated service (312). The subsystem of FIG. 3B assists in the provisioning, deploying, and maintaining of a topology that supports the applications, and provides application models that match appropriate infrastructure templates. In one example, the models of the applications executed on the deployed topology utilize designed topologies that are easily reconciled with the templates defining the infrastructure topologies of the topology.

A topology designer (301) may be used to design and create an application model (319). The application model (319) is defined by a lifecycle management topology. As described above in connection with the LCM topology (302), the application model (319) comprises a number of nodes (319-1, 319-2, 319-3). A number of policies and lifecycle management actions (LCMA) are associated with each of the nodes (319-1, 319-2, 319-3) of the application model (319).

A topology designer (301) may also be used to create a number of infrastructure and/or platform templates (320). The templates (320) are defined by a lifecycle management topology. As described above in connection with the LCM topology (302), the templates (320) comprise a number of nodes (320-1, 320-2, 320-3, 320-4, 320-5). A number of policies and lifecycle management actions (LCMA) are also associated with each of the nodes (320-1, 320-2, 320-3, 320-4, 320-5) of the templates (320).

In one example, the topology designers (301), self-service portal (309), and resource offering manager (308), alone or in combination, may associate a number of policies (303) and LCMAs (304) with the nodes (319-1, 319-2, 319-3, 320-1, 320-2, 320-3, 320-4, 320-5) of the application model (319) and infrastructure template (320). In another example, a separate policy engine and LCMA engine may be provided to associate the nodes (319-1, 319-2, 319-3, 320-1, 320-2, 320-3, 320-4, 320-5) of the application model (319) and infrastructure template (320) with the policies and LCMAs as described above.

As depicted in FIG. 3B, a number of models (319) may be presented as possible matches or near matches for a number of infrastructure templates (320). In one example, rather than using a topology designer (301), a number of application models (319) resources may be provided within the topology-based management broker (200). In this example, the topology-based management broker (200) may obtain application models (319) from, for example, the catalog (310), the RTSM (315), another model source, or combinations thereof. A user may browse through these model sources and obtain a number of application models (319) that may be reconciled with the infrastructure templates (320). In this manner, the topology designer (301) may design a number of application models (319) or a number of application models (319) may be obtained from the above-described resource. Thus, the application models (319) may be application topologies designed by the topology designer (301), or realized application topologies as described above.

Similarly, as depicted in FIG. 3B, a number of templates (320) are presented as possible matches or near matches for the application model (319). In one example, rather than using a topology designer (301), a number of template (320) resources may be provided within the topology-based management broker (200). In this example, the topology-based management broker (200) may obtain templates (320) from, for example, the catalog (310), the RTSM (315), another template source, or combinations thereof. A user may browse through these template sources and obtain a number of templates (320) that may be reconciled with the application model (319). In this manner, the topology designer (301) may design a number of templates (320) or a number of templates may be obtained from the above-described resource. Thus, the templates (320) may be infrastructure topologies designed by the topology designer (301), or realized infrastructure topologies as described above.

The CDA subsystem described in FIG. 3B comprises a stitching engine (321) to stitch or combine the application model (319) to the infrastructure template (320). The stitching engine (321) may use any type of method to stitch the application model (319) to the infrastructure template (320) based on the policies and LCMA associated with the application model (319) to the infrastructure template (320). In one example, the stitching engine (321) may use a matching process in which the stitching engine (321) matches the policies, requirements, and capabilities associated with the nodes (319-1, 319-2, 319-3) of a number of application models (319) with the policies, requirements, and capabilities of the nodes (320-1, 320-2, 320-3, 320-4, 320-5) of a number of infrastructure templates (320). In this example, the stitching engine (321) may browse through the template sources described above to find a match or near match. Once a match is found, the stitching engine (321) matches a number of nodes (319-1, 319-2, 319-3) of the application model (319) with a number of the nodes (320-1, 320-2, 320-3, 320-4, 320-5) of the matching infrastructure template (320).

Another method the stitching engine (321) may use to stitch the application model (319) to the infrastructure template (320) may comprise an algorithmic matching method. In this method, the stitching engine (321) determines a match mathematically via algorithms that employ the policies in performing the matching decisions. In one example, this may include inference methods in which requirements in the application level are tagged or otherwise associated with components that support them in a library of infrastructure topologies called a DSL database (323), wherein the overall infrastructure template (320) is aggregated first before the aggregation is extended to the application model (319).

A definitive software library (DSL) is a secure storage device, consisting of physical media or a software repository located on a network file server. Definitive authorized versions of all software configuration items (CIs) or artifacts that may be required to deploy the application designed in the application model (319) may be stored and protected in a DSL. In the present example, a number of infrastructure topologies (320) are stored in the DSL. Thus, the DSL contains master copies of a number of infrastructure topologies (320) developed using the present systems and methods or purchased from an third party. All related documentation related to the infrastructure topologies (320) is also stored in the DSL. The DSL database (323) of the present topology-based management broker (200) comprises a number of objects used in the deployment of the application after the application model (319) has been developed and is ready for deployment on the infrastructure template (320). In one example, a topology designer (301) may also provide additional design elements within the topology before, during, and/or after the stitching engine (321) processes the application model (319) and the infrastructure template (320) to create the topology (302) with a number of nodes (302-1, 302-2, 302-3, 302-4, 302-5, 302-6, 302-7).

Once the stitching engine (321) has completed the stitching process as described above, a complete topology (302) is created. The topology created by the subsystem of FIG. 3B may have additional policies and LCMAs associated with the nodes as described above in connection with FIG. 3A. The topology (302) created via the subsystem of FIG. 3B may be stored in the catalog (310), the DSL database, or other storage device or system. The topology (302) created via the subsystem of FIG. 3B may be processed in a similar manner as described above in connection with the topology (302) developed in FIG. 1A. The LCM engine (311) obtains the artifacts required to deploy the application designed in the application model (319) from the DSL (323) and executes the topology (302).

In one example, an application lifecycle management (ALM) device (322) depicted in FIG. 3A is used to trigger the deployment of the topology developed on the subsystem depicted in FIG. 3B of the overall topology-based management broker (200). In one example, Hewlett Packard's Application Lifecycle Management (HP ALM) is used. HP ALM is a unified software platform developed and distributed by Hewlett Packard Company. HP ALM assists in accelerating the delivery of secure, reliable modern applications in a network.

Figure 6:
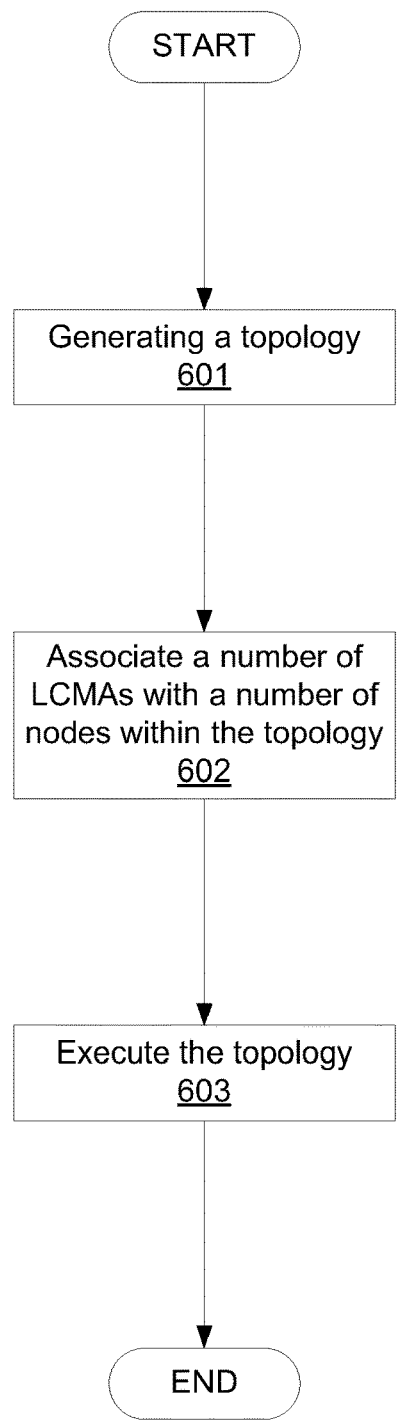
FIG. 6 is a flowchart showing a method for brokering a cloud service, according to one example of the principles described herein.

FIG. 6 is a flowchart showing a method for brokering a cloud service, according to one example of the principles described herein. The method of FIG. 6 includes generating (block 601) a topology (FIGS. 3A and 3B, 102). As described above, in one example, a number of topology designers (FIG. 3A, 301) including a number of topology design tools, GUIs, and coding scripts, may be used by a human designer to design the topology (FIGS. 3A and 3B, 302). The topology (FIGS. 3A and 3B, 302) may be designed using either or both of the subsystems depicted in FIGS. 3A and 3B. Further, in one example, topologies (FIGS. 3A and 3B, 302) designed and stored may be browsed or search for in a database of topologies (FIGS. 3A and 3B, 302) and used as a portion of the topology (FIGS. 3A and 3B, 302) to be instantiated.

In one example, topologies (302) may be generated by designing a topology (302) de novo via a number of topology designers (301). In another example, the topology may be generated (block 601) by stitching a number of applications models (FIG. 3B, 319) and a number infrastructure templates (FIG. 3B, 320) together using a number of stitching methods. As will be described in more detail below, the stitching engine (FIG. 3B, 321) may obtain a number of infrastructure topologies (FIG. 3B, 320), and stitch (FIG. 9, block 903) a number of application models (FIG. 3B, 319) to a number of appropriate infrastructure templates (FIG. 3B, 320). In another example, the application models (FIG. 3B, 319) and infrastructure templates (FIG. 3B, 320) may be designed de novo by a number of topology designers (301). In one example, a number of persons may use the topology designers (301) to design the topologies (302) in accordance with the method of FIG. 6. These individuals may be service designers, infrastructure architects or administrators, system administrators, information technology operators, offer managers, or users, among other personnel with roles in the design of a topology. In still another example, the topology designers (301) may be operated by a third party.

The method may continue by associating (block 602) a number of LCMAs (304) with a number of nodes (302-1, 302-2, 302-3, 302-4, 302-5, 302-6, 302-7) within the topology (302). In one example, block 602 may be performed with the resource offering manager (FIG. 3A, 308). The LCMAs orchestrate a number of application programming interfaces (APIs) of a number of resources for purposes of managing the lifecycle of a given cloud service capability. In one example, the LCMAs are uniform resource identifiers (URIs) of application programming interfaces (APIs) that perform calls in order to execute the APIs.

In one example, policies (FIG. 3A, 303) may also be associated with a number of nodes (302-1, 302-2, 302-3, 302-4, 302-5, 302-6, 302-7) within the topology (302). In one example, association of policies (FIG. 3A, 303) with a number of nodes (302-1, 302-2, 302-3, 302-4, 302-5, 302-6, 302-7) within the topology (302) may be performed with the resource offering manager (FIG. 3A, 308). A policy is any data or metadata used to assist in the management of the provisioning, deploying, monitoring, enforcement, and remediation within a cloud service. The policies may represent a number of rules or sets of rules that are applicable to the provisioning, deploying, monitoring, enforcement, and remediation tasks associated with a number of computing devices within a cloud service environment.

The topology (302) may be executed (block 603). In one example, the topology (302) is executed (block 603) based on the LCMAs (304) associated (block 602) with a number of nodes (302-1, 302-2, 302-3, 302-4, 302-5, 302-6, 302-7) within the topology (302). Further, in another example, the topology (302) is executed (block 603) based on the policies (303) associated with a number of nodes (302-1, 302-2, 302-3, 302-4, 302-5, 302-6, 302-7) within the topology (302).

In still another example, a number of scripts may be created for execution (block 603) of the topology (302). The scripts define executable logic for instantiating a cloud service based on the topology (FIGS. 3A and 3B, 302) and policies (FIG. 3A, 303). The method of FIG. 6 will be described in more detail in connection with FIG. 7.

Figure 7:
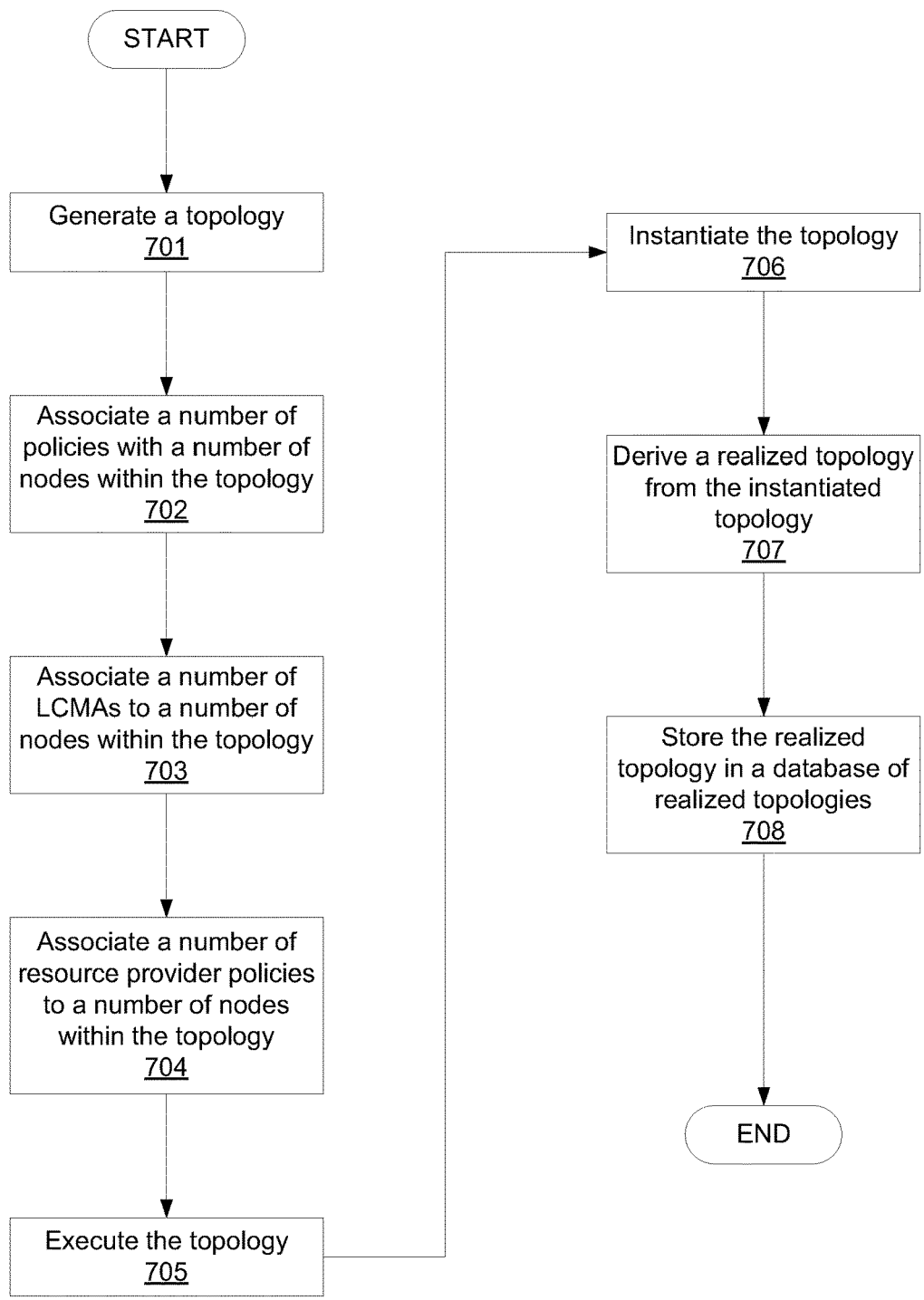
FIG. 7 is a flowchart showing a method for brokering a cloud service, according to another example of the principles described herein.

FIG. 7 is a flowchart showing a method for brokering a cloud service, according to another example of the principles described herein. The method of FIG. 7 may begin by generating (block 701) a topology. As described above, in one example, a number of topology designers (FIG. 3A, 301) including a number of topology design tools, GUIs, and coding scripts, may be used by a human designer to design the topology (FIGS. 3A and 3B, 302). The topology (FIGS. 3A and 3B, 302) may be designed using either or both of the subsystems depicted in FIGS. 3A and 3B. Further, in one example, topologies (FIGS. 3A and 3B, 302) designed and stored may be browsed or search for in a database of topologies (FIGS. 3A and 3B, 302) and used as a portion of the topology (FIGS. 3A and 3B, 302) to be instantiated.

In one example, topologies (302) may be generated by designing a topology (302) de novo via a number of topology designers (301). In another example, the topology may be generated (block 601) by stitching a number of applications models (FIG. 3B, 319) and a number infrastructure templates (FIG. 3B, 320) together using a number of stitching methods. As will be described in more detail below, the stitching engine (FIG. 3B, 321) may obtain a number of infrastructure topologies (FIG. 3B, 320), and stitch (block 903) a number of application models (FIG. 3B, 319) to a number of appropriate infrastructure templates (FIG. 3B, 320). In another example, the application models (FIG. 3B, 319) and infrastructure templates (FIG. 3B, 320) may be designed de novo by a number of topology designers (301).

In one example, a number of persons may use the topology designers (301) to design the topologies (302) in accordance with the method of FIG. 6. These individuals may be service designers, infrastructure architects or administrators, system administrators, information technology operators, offer managers, or users, among other personnel with roles in the design of a topology. In still another example, the topology designers (301) may be operated by a third party.

The method may continue by associating (block 702) a number of policies (FIG. 3A, 303) with a number of nodes (302-1, 302-2, 302-3, 302-4, 302-5, 302-6, 302-7) within the topology (302). In one example, block 702 may be performed with the resource offering manager (FIG. 3A, 308). A policy is any data or metadata used to assist in the management of the provisioning, deploying, monitoring, enforcement, and remediation within a cloud service. The policies may represent a number of rules or sets of rules that are applicable to the provisioning, deploying, monitoring, enforcement, and remediation tasks associated with a number of computing devices within a cloud service environment.

At block 703, a number of lifecycle management actions (LCMAs) (FIG. 3A, 304) may be applied to a number of nodes within the topology. The LCMAs orchestrate a number of application programming interfaces (APIs) of a number of resources for purposes of managing the lifecycle of a given cloud service capability. In one example, the LCMAs are uniform resource identifiers (URIs) of application programming interfaces (APIs) that perform calls in order to execute the APIs.

In one example, the policies (FIG. 3A, 303) and LCMAs (FIG. 3A, 304) may be associated with the nodes (302-1, 302-2, 302-3, 302-4, 302-5, 302-6, 302-7) within the topology (302) via data or metadata describing the nodes (302-1, 302-2, 302-3, 302-4, 302-5, 302-6, 302-7) of the topology (FIG. 3A, 302). The data or metadata may be provided in a number of files describing the nodes or topology, or in a file associated therewith. In another example, the LCMAs are associated with the aspects of the topology by default by virtue of what computing device the node or nodes (302-1, 302-2, 302-3, 302-4, 302-5, 302-6, 302-7) represent.

In another example, the LCMAs are associated with the aspects of the topology by explicitly providing a number of functions, $F_{Action}$, that define how to select a resource provider to implement the action based on the policies associated with the aspects of the topology and the policies of the different relevant resource providers. These functions define how a resource provider is selected to implement the action based on the policies associated with the aspect of the topology and the policies of the different relevant resource providers. In one example, the processes of blocks 702 and 703 may be performed in any order serially, or in parallel. Further, in one example, a number of persons may use the topology designers (301) to design the topologies (302) in accordance with the method of FIG. 6. These individuals may be service designers, infrastructure architects or administrators, system administrators, information technology operators, offer managers, or users, among other personnel with roles in the design of a topology. In still another example, the topology designers (301) may be operated by a third party.

A number of resource provider policies (308-1) may be associated (block 704) with a number of nodes (302-1, 302-2, 302-3, 302-4, 302-5, 302-6, 302-7) within the topology (302). Resource provider policies (308-1) are any policies associated with a number of resource providers' offerings that guide the selection of a number of resources. In one example, the resource provider policies (308-1) may be dynamic functions that define the computing abilities of a computing resource. In this example, a computing resource that provides a defined level of computing resources such as, for example, processing power, may be provisioned by the LCM engine (311) and resource offering manager (308) if the defined level of that computing resource meets a number of requirements within the topology (302).

The topology (302) may be executed (block 705). In one example, the topology (302) is executed (block 705) based on the policies, (303), LCMAs (304), resource provider policies (308-1), or combinations thereof. In one example, a number of scripts may be created for execution (block 705). The scripts define executable logic for instantiating a cloud service based on the topology (FIGS. 3A and 3B, 302), policies (FIG. 3A, 303), LCMAs (FIG. 3A, 304), resource provider policies (308-1), or combinations thereof.

A topology LCM engine (FIG. 3A, 311) instantiates (block 706) the topology (FIGS. 3A and 3B, 302). In one example, instantiation (block 706) of the topology (302) is based on the policies (FIG. 3A, 303), LCMAs (FIG. 3A, 304) resource provider policies (308-1), executable scripts, or combinations thereof. In one example, the topology LCM engine (FIG. 3A, 311) obtains the workflows or sequences of serial and/or parallel scripts created at block 705 during execution, calls a resource provider via the resource offering manager (FIG. 3A, 308), and instantiates the topology (FIGS. 3A and 3B, 302) based on the policies (FIG. 3A, 303), LCMAs (FIG. 3A, 304) resource provider policies (308-1), and executable scripts to create an instantiated service (FIG. 3A, 312).

A number of realized topologies (FIG. 3A, 314) may be derived (block 707) from the instantiated service (FIG. 3A, 312). In one example, the topology LCM engine (FIG. 3A, 311) derives a realized topology (FIG. 3A, 314) from each instantiated service (FIG. 3A, 312). A number of the realized topologies (FIG. 3A, 314) may be stored (block 708) in a database of realized topologies. In one example, the LCM engine (FIG. 3A, 311) stores the realized topologies (FIG. 3A, 314) in the realized topology system management (RTSM) database (FIG. 3A, 315); a logical system repository of realized topologies (FIG. 3A, 314). In one example, the RTSM database (315) comprises a database management system (DBMS). The DBMS is a combination of hardware devices and software modules that interact with a user, other applications, and the database itself to capture and analyze data.

In one example, the RTSM database (FIG. 3A, 315) is a configuration management database (CMDB); a repository of information related to all the components of a realize topology (FIG. 3A, 314). The realized topology (FIG. 3A, 314) comprises a model of the topology (FIG. 3A, 302), with the policies applied to the various nodes (FIG. 3A, 302-1, 302-2, 302-3, 302-4, 302-5, 302-6, 302-7). A number of properties of the nodes (FIG. 3A, 302-1, 302-2, 302-3, 302-4, 302-5, 302-6, 302-7) of the realized topology (FIG. 3A, 314) are defined within the realized topology (FIG. 3A, 314). These properties include any details of any instantiated topology (FIG. 3A, 312) that is created or updated via the topology-based management broker (FIG. 3A, 200), and may include, for example, the internet protocol (IP) address of the nodes, and characteristics and computing parameters of the nodes, among many other properties.

The RTSM (FIG. 3A, 315) is a repository that stores each instance of a realized topology (FIG. 3A, 314). In this manner, every time a topology (FIG. 3A, 302) is designed, provisioned, and deployed, the topology-based management broker (FIG. 3A, 200) captures the realized topology (FIG. 3A, 314) of that instantiated topology (312). Thus, the RTSM (FIG. 3A, 315) contains a realized topology (FIG. 3A, 314) of every topology (FIG. 3A, 302) that has been instantiated within the topology-based management broker (FIG. 3A, 200). In one example, in every instance of the modification of an existing instantiated topology (312), the realized topology (FIG. 3A, 314) resulting from that modification is also stored within the RTSM (FIG. 3A, 315).

Figure 8:
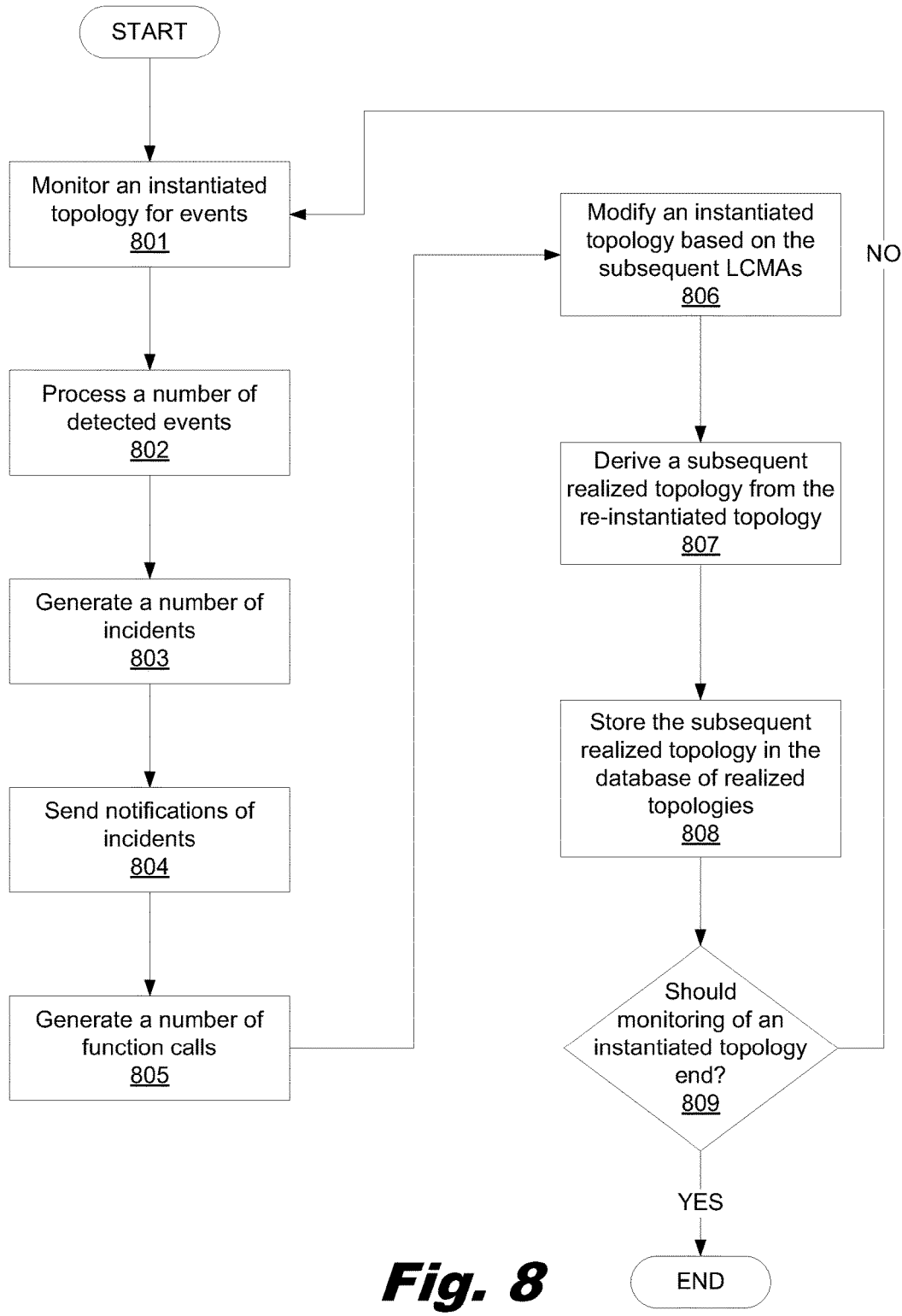
FIG. 8 is a flowchart showing a method for remediating a number of incidents within a cloud service, according to one example of the principles described herein.

FIG. 8 is a flowchart showing a method for remediating a number of incidents within a cloud service, according to one example of the principles described herein. The remediation method of FIG. 8 may be performed alone, or in combination with any number of additional process described herein such as those process described in FIGS. 6, 7, and 8. Further, any block within the method of FIG. 8 may be performed alone or in combination with any number of other processes within FIG. 8. For example, a monitoring process described at block 801 may be performed alone without the remaining processes being performed, or less than all of the remaining processes being performed.

The remediation method of FIG. 8 may include monitoring (block 801) an instantiated topology (FIG. 3A, 312) for a number of events. The monitoring system (313) monitors (block 801) an instantiated topology (FIG. 3A, 312) based on the monitoring policies associated with the topology (302) and the nodes (302-1, 302-2, 302-3, 302-4, 302-5, 302-6, 302-7) of the topology (302) as described above. In one example, the monitoring system, based on the policies, monitors for a number or set of metrics. A number of events may be derived from the detected metrics, The monitoring system (313) sends data representing a number of the events to the event handler (313) based on a number of the policies associated with the designed topology (302) and the instantiated service (312). For example, as described above, the monitoring policies include a portion that defines what to do with the monitored events that result from the monitoring such as, for example, how to handled the events, where the events are sent, what devices or individuals address the events, how incidents resulting from the processing of the events are handled, how the events and incidents are processed (e.g., processed as aggregated, filtered, or correlated events, among other forms of processing), and how the resulting incidents are handled.

A number of events detected by the monitoring system (313) may be processed by the event handler (316) based on a number of the policies described above. Handling (block 802) of events may include, for example, processing the events as aggregated, filtered, or correlated events, among other forms of processing. Further, based on the above-described policies, the event handler (313) may handle (block 802) the events by determining whether the events should be processed into incidents, or whether to notify a number of users of the system (200), for example.

A number of incidents are generated (block 802). In one example, the incidents are created by the event handler (FIG. 3A, 316) based on a number of policies including, for example, monitoring and remediation policies. Further, in one example, the incidents are generated (block 803) by the event handler (FIG. 3A, 316) based on the events detected by the monitoring system (313). In another example, the incidents are generated (block 803) by obtaining a number of service tickets from an information technology (IT) service management system (ITSM), and, with the event handler, creating a number of incidents based on the service tickets. As described above, an ITSM (316-1) may also be a source of incidents. An ITSM system (316-1) implements and manages the quality of IT services that meet the needs of the user. In one example, the ITSM system (316-1) is managed by the user, a service provider, a third party, or combinations thereof, in which a service ticket is opened by one of these groups or individuals. In another example, the ITSM system (316-1) may automatically enter a service ticket based on the events detected by the monitoring system. If the ITSM system (316-1) determines that the instantiated system (312) or a number of nodes (302-1, 302-2, 302-3, 302-4, 302-5, 302-6, 302-7) thereof are not appropriately provisioned, are wrongly provisioned, or are otherwise unfit for the instantiated system (312), the ITSM system (316-1) may, like the event handler (316), provide a remediation determination in the form of an incident sent to the remediation engine (317).

The incidents generated by the event handler (316) and the ITSM system (316-1) may be brought to the attention of a user, administrator, third party, or other user of the topology-based management broker (200) or instantiated service (312) in the form of a notification. A number of notifications are sent (block 804) regarding the incidents created by the event handler (313). These notifications may be sent (block 804) to a number of devices and users within the system (200). For example, a number of notifications may be sent to the self-service subscription management engine (318). The self-service subscription management engine (318) may present the notifications to a user via, for example, the GUI (318-1) associated with the self-service subscription management engine (318). Thus, a number of notifications are presented (block 804) to a user regarding the incidents.

In one example, the process defined by block 804 is optional. As described above, the event handler (FIG. 3A, 316) may or may not provide notifications to a user based on a number of policies associated with the instantiated topology (312). When the event handler (FIG. 3A, 316) does dispatch notifications to a user, a varying level of user interaction may be allowed or required including allowing a user to interact with, for example, a number of the GUIs (318-1) produced by the self-service subscription management engine (318) before a number of remediation actions are taken. As described above, remediation policies define whether a notification is to take place, how that notification is handled, and at what degree user input is allowed or required. Thus, the remediation policies may include: (1) providing notifications to a user, consumer, or administrator; (2) obtaining instructions from the user, consumer, or administrator; (3) taking manual actions input by the user, consumer, or administrator; (4) taking autonomous actions after receiving instructions from the user, consumer, or administrator; (5) taking autonomous actions without receiving instructions from the user, consumer, or administrator; (6) taking autonomous actions without notifying the user, consumer, or administrator or receiving instructions from the user, consumer, or administrator; (7) proposing a remediation action to a user or administrator for approval, and performing the proposed remediation action if approved by the user or administrator, or combinations thereof.

At block 805, a number of function calls are generated. The function calls issued to the LCM engine (311) by the remediation engine (317) to remediate the incidents may be based on a number of LCMAs associated with the elements of the instantiated topology (312), the incidents to be remediated, and the policies associated with the elements of the topology (302). In this manner, the remediation engine (317) executes, via a processor, logic to correct the incidents reported by the event handler (316) and/or ITSM system (316-1) in order to generate (block 805) the function calls.

Using the function calls generated by the remediation engine (317), the topology LCM engine (FIG. 3A, 311) modifies (block 806) an instantiated topology (FIG. 3A, 312) based on the subsequent LCMAs created by the remediation engine (317). Modification of an instantiated topology (FIG. 3A, 312) may include modifying the topology (312) or a portion thereof, modifying the a number of nodes or a group of nodes, addition of a number of nodes, groups of nodes, or topologies, deletion of a number of nodes, groups of nodes, or topologies, among many other types of changes that may be made to an instantiated service (312). Further, modification of the instantiated topology (312) may include re-instantiation of a previously instantiated topology (312).

A subsequent realized topology (FIG. 3A, 314) may be derived (block 807) from the modified topology (FIG. 3A, 312), and stored (block 808) in a database of realized topologies. In one example, the LCM engine (FIG. 3A, 311) stores the realized topologies (FIG. 3A, 314) in the realized topology system management (RTSM) database (FIG. 3A, 315).

A determination (block 809) may be made as to whether monitoring of an instantiated topology (FIG. 3A, 312) is to end. Reasons to end the monitoring of an instantiated topology (FIG. 3A, 312) may include, for example, completion of a contract such as an SLA, ending of the cloud services provided by one or more service providers, If it is determined that monitoring of the instantiated topology (FIG. 3A, 312) is to end (block 809, determination YES), then the process terminates. If, however, it is determined that monitoring of the instantiated topology (FIG. 3A, 312) is not to end (block 809, determination NO), then the process loops back to block 801, and the process of remediation is repeated. In one example, the remediation process may be performed any number of iterations throughout the lifecycle of an originally instantiated topology (FIG. 3A, 312). In this manner, events that may occur within the instantiated topology (FIG. 3A, 312) may be addressed in order to maintain a working instantiated topology (FIG. 3A, 312). Further, the remediation process described in FIG. 8 allows for the instantiated topology (FIG. 3A, 312) to be amended or adjusted to provide a scalable instantiated topology (FIG. 3A, 312).

Figure 9:
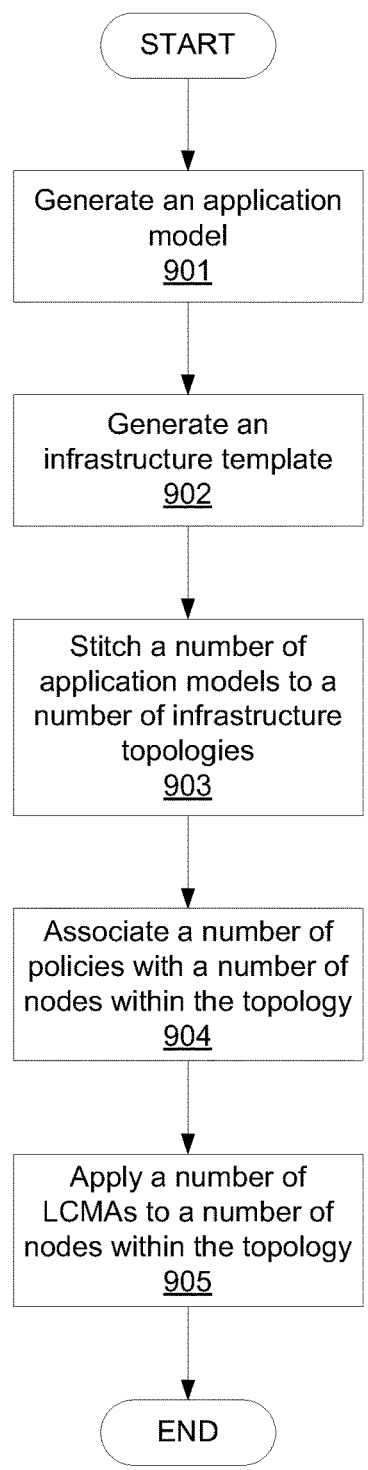
FIG. 9 is a flowchart showing a method of designing a topology, according to one example of the principles described herein.

FIG. 9 is a flowchart showing a method of designing a topology, according to one example of the principles described herein. The method of FIG. 9 may begin by generating (block 901) an application model (FIG. 3B, 319). In one example, a topology designer (301) may be used to design and create the application model (FIG. 3B, 319), and, in this manner, generate (701) an application model (FIG. 3B, 319). In another example, the application model (FIG. 3B, 319) may be obtained from a number of application model (FIG. 3B, 319) sources such as, for example, the catalog (FIG. 1A, 310), the RTSM (FIG. 1A, 315), or the DSL database (FIG. 3B, 323), among other application model (FIG. 3B, 319) sources. The application model (FIG. 3B, 319) is defined by a lifecycle management topology. As described above in connection with the LCM topology (FIG. 3A, 302), the application model (FIG. 3B, 319) comprises a number of nodes (FIG. 3B, 319-1, 319-2, 319-3).

A number of infrastructure templates (FIG. 3B, 320) may also be generated (block 902). In one example, a topology designer (301) may be used to design and create the infrastructure template (FIG. 3B, 320). In another example, the infrastructure template (FIG. 3B, 320) may be obtained from a number of infrastructure template (FIG. 3B, 320) sources such as, for example, the catalog (FIG. 1A, 310), the RTSM (FIG. 1A, 315), or the DSL database (FIG. 3B, 323), among other infrastructure template (FIG. 3B, 320) sources. The infrastructure template (FIG. 3B, 320) is defined by a lifecycle management topology. As described above in connection with the LCM topology (FIG. 3A, 302), the infrastructure template (FIG. 3B, 320) comprises a number of nodes (FIG. 3B, 319-1, 319-2, 319-3). In one example, a number of persons may use the topology designers (301) to design the application models (FIG. 3B, 319) and infrastructure templates (FIG. 3B, 320). These individuals may be service designers, infrastructure architects or administrators, system administrators, information technology operators, offer managers, or users, among other personnel with roles in the design of a topology.

A number of application models (FIG. 3B, 319) are stitched (block 903) to a number of infrastructure templates (FIG. 3B, 320). In one example, the stitching engine (FIG. 3B, 321) may obtain a number of infrastructure topologies (FIG. 3B, 320) stored in, for example, the DSL database (FIG. 3B, 323) or other source of infrastructure templates (320), and stitch (block 902) a number of application models (FIG. 3B, 319) to a number of appropriate infrastructure templates (FIG. 3B, 320). In another example, the infrastructure templates (FIG. 3B, 320) may be designed de novo by a number of topology designers (301).

The stitching engine (FIG. 3B, 321) may use any type of method to stitch the application models (FIG. 3B, 319) to the infrastructure templates (FIG. 3B, 320) based on the policies and LCMA associated with the application models (FIG. 3B, 319) to the infrastructure templates (FIG. 3B, 320). In one example, the stitching engine (FIG. 3B, 321) may use a matching process in which the stitching engine (FIG. 3B, 321) matches the policies, requirements, and capabilities associated with the nodes (FIG. 3B, 319-1, 319-2, 319-3) of the application models (FIG. 3B, 319) with the policies, requirements, and capabilities of the nodes (FIG. 3B, 320-1, 320-2, 320-3, 320-4, 320-5) of the infrastructure templates (FIG. 3B, 320). In this example, the stitching engine (FIG. 3B, 321) may browse through the template sources described above to find a match or near match. Once a match is found, the stitching engine (FIG. 3B, 321) matches a number of nodes (FIG. 3B, 319-1, 319-2, 319-3) of the application models (319) with a number of the nodes (FIG. 3B, 320-1, 320-2, 320-3, 320-4, 320-5) of the matching infrastructure templates (FIG. 3B, 320).

Another method the stitching engine (FIG. 3B, 321) may use to stitch the application models (FIG. 3B, 319) to the infrastructure templates (FIG. 3B, 320) may comprise an algorithmic matching method. In this method, the stitching engine (FIG. 3B, 321) determines mathematically via algorithms that employ the policies in performing the matching decisions. In one example, this may include inference methods in which requirements in the application level are tagged or otherwise associated with components that support them in the DSL database (FIG. 3B, 323), wherein the overall infrastructure topology (FIG. 3B, 320) is aggregated first before the aggregation is extended to the application models (FIG. 3B, 319).

A number of policies and lifecycle management actions (LCMAs) are associated (blocks 704 and 705) with each of the nodes (FIG. 3B, 319-1, 319-2, 319-3) of the application model (FIG. 3B, 319) and nodes of the infrastructure topology (FIG. 3B, 320). In one example, the association (blocks 704 and 705) of the number of policies (303) and LCMAs (304) with the nodes (319-1, 319-2, 319-3, 320-1, 320-2, 320-3, 320-4, 320-5) of the application model (319) and infrastructure topology (320) may be performed by the topology designers (301), self-service portal (309), and resource offering manager (308), alone or in combination. In another example, a separate policy engine and LCMA engine may be provided to associate the nodes (319-1, 319-2, 319-3, 320-1, 320-2, 320-3, 320-4, 320-5) of the application model (319) and infrastructure topology (320) with the policies (303) and LCMAs (304) as described above.

In one example, the processes of blocks 704 and 705 of associating policies (303) and lifecycle management actions (LCMAs) (304) with each of the nodes (FIG. 3B, 319-1, 319-2, 319-3) of the application model (319) and nodes of the infrastructure topology (FIG. 3B, 320) may be performed before, during, or after the stitching process described in connection with block 903. In one example where policies and LCMAs are associated before the stitching process of block 902, the policies (303) and LCMAs (304) may be associated with a number of nodes or groups of nodes within the application model (319) and infrastructure topology (320), as well as with the application model (319) as a whole and infrastructure topology (320) as a whole. In this example, additional policies (303) and LCMAs (304) may be associated with the topology (302) created via the stitching process of block 902. In another example, the processes of blocks 704 and 705 of associating policies (303) and lifecycle management actions (LCMAs) (304) with each of the nodes (FIG. 3B, 319-1, 319-2, 319-3) of the application model (319) and nodes of the infrastructure topology (FIG. 3B, 320) may be optional as to performance of these processes after the stitching process of block 902. In still another example, the processes of blocks 704 and 705 of associating policies (303) and lifecycle management actions (LCMAs) (304) with each of the nodes (FIG. 3B, 319-1, 319-2, 319-3) of the application model (319) and nodes of the infrastructure topology (FIG. 3B, 320) may be performed before and after stitching process of block 902.

The above processes described in FIG. 9 results in a completely designed topology (302) similar to the topology (302) described above in connection with FIG. 3A. Thus, the method described in FIG. 9 may be further associated with the process described herein regarding FIGS. 6, 7, and 8. For example, the topology (FIG. 3B, 302) resulting from the method of FIG. 9 may be used as the input topology (FIG. 3A, 302) for the method described in connection with FIGS. 6 and 7 at, for example, blocks 601 and 701. Further, in another example, the topology (FIG. 3B, 302) resulting from the method of FIG. 9 may be used as the input topology (FIG. 3A, 302) for instantiation in the remediation method described in connection with FIG. 8. Further still, in one example, a number of persons participate in the method described in FIG. 9. These individuals may be service designers, infrastructure architects or administrators, system administrators, information technology operators, offer managers, or users, among other personnel with roles in the design, execution, monitoring, and remediation of a topology (302).

FIGS. 10 through 12B will now be described in connection with the execution of lifecycle management topologies (302) using a number of sets of parallel lifecycle management logics. As described above regarding lifecycle management actions (LCMAs), a number of LCMAs are associated with each node (302-1, 302-2, 302-3, 302-4, 302-5, 302-6, 302-7) within the topology (302). LCMAs orchestrate a number of application programming interfaces (APIs) of a number of network resources for purposes of managing the lifecycle of a given network capability. In one example, the LCMAs are provided by reference within the file comprising the data or metadata described above in connection with the policies (103).

Relationships between nodes (302-1, 302-2, 302-3, 302-4, 302-5, 302-6, 302-7) within the topology (302) may also be expressed as logic that interacts with the lifecycle management of each node. One type of relationship includes conditions regarding the order by which computing resources from the resource providers are provisioned at the time of execution and instantiation of the topology (302). For example, the provisioning of a particular computing device such as a server may need to be performed before another device within the cloud service. Other forms of relationships between nodes include actions that interact with the lifecycle management of the nodes including, for example, provisioning, duplicating, destroying, pausing, saving, copying, modifying, and moving, of the nodes, among other lifecycle management actions.

In one example, the nodes (302-1, 302-2, 302-3, 302-4, 302-5, 302-6, 302-7) may be defined by the logic of their lifecycle management. In this example, the logic decorating the nodes perform the same function. In another example, the nodes (302-1, 302-2, 302-3, 302-4, 302-5, 302-6, 302-7) may be defined using a standard data type such as, for example, TOSCA. In this example, the node types are associated with different resource providers that implement the types.

The relationships between the nodes (302-1, 302-2, 302-3, 302-4, 302-5, 302-6, 302-7) within a topology (302) may also be associated with lifecycle management actions or logic. These lifecycle management actions associated with the relationships between nodes dictate the provisioning and instantiation of the topology, and management of the lifecycle of the nodes and topology after provisioning and instantiation.

Topologies (302) to be executed and instantiated via the present systems and methods may be designed de novo via a number of topology designers and/or via a application model and infrastructure template stitching process as described above, or any other methods of creating or obtaining a topology with associated LCMAs and policies. Further, as will be described in more detail below, the LCM engine (311) may also directly execute a blueprint. With regard to blueprints, blueprints describe services in terms of the collections of workflows that are to be performed on all the components that make up the service in order to perform a particular lifecycle management action. Blueprints may be expressed as comprising a number of objects within a hierarchy of objects.

Still further, topologies may also be generated by transforming a blueprint into a topology. The transformation of a blueprint into a topology may begin by obtaining a blueprint (100) from a blueprint source, and deriving a number of containment relationships from the blueprint (100). This may be performed by the blueprint analysis module (1012). The containment relationships define a number of hierarchical relationships between a number of objects within the blueprint (100). A number of temporal dependency relationships may also be derived from the blueprint (100), the temporal dependency relationships defining a number of provisioning relationships between objects within the blueprint (100). For example, the temporal dependency relationships may define in what order various devices represented by the objects in the blueprint are to be provisioned. A number of objects may be required to be provisioned or instantiated before other objects. For example, temporal dependency relationships may define that a number of infrastructure elements are first deployed, and then a number of application elements deployed on top of the infrastructure elements. In one example, the temporal dependency relationships may be defined using a UML metamodel (M2-model); an example of a Layer 2 Meta-Object Facility model developed by the Object Management Group (OMG).

A number of additional relationships between a number of the objects within the blueprints (100) may also be derived. The additional relationships comprise a number of parameters derived by the topology LCM engine (311) from a number of the containment relationships, a number of the temporal dependency relationships, a number of objects, or combinations thereof. Knowing of these additional relationships assists the topology designer (301) in creating a topology that appropriately fits an intended use and will work with a number of applications intended to run on an instantiated service (312) derived from the topology (302). A topology may be created based on the number of objects within the blueprint (100), a number of the containment relationships, a number of the temporal dependency relationships, a number of the additional relationships, or a combination thereof. Any format may be used to describe topologies (302) derived from blueprints (100). In one example, TOSCA may be used to describe topologies (302) derived from the blueprints (100).

A lifecycle management topology derived from a blueprint may comprise a number of nodes and relationships associated to a combination of conditions and actions for each life cycle management operation: The different elements of infrastructure, platforms, applications, and services are described in the lifecycle management topologies (302). In the topologies (302), elements in each layer are defined as nodes (302-1, 302-2, 302-3, 302-4, 302-5, 302-6, 302-7) as described above. A number of policies and LCMAs may also be associated with the blueprint-derived topology (302). The association of the policies (303) and LCMAs (304) with the topology (302) may be performed as described above. In this manner, even though a number of policies and LCMAs may be derived from the blueprint (100) by way of derivation of the containment relationships, the temporal dependency relationships, and the additional relationships from the blueprint, a number of additional policies and LCMAs may be added to the blueprint-derived topology (302). For example, the topology designer (301) and the resource offering manager (308) may associate an additional number of policies (303) and LCMAs (304) in order to create a topology (302) that, when instantiated, will perform as desired or expected. Execution of the policies (303) provides for a way to provision the topology (302) with a configuration that is identical or approximately identical to an instantiated service that is instantiated based on the blueprint. In this manner, a LCM topology (302) is derived from a blueprint. The LCM topology (302) derived from the blueprint may be provisioned and instantiated as described above in connection with FIGS. 3A, 3B, 5-7, and 11-12B. Having explained the various types of topologies that may be executed and instantiated by the lifecycle management engine (311), the systems and methods used to execute and instantiate a service based on the topologies will now be described in more detail.

Figure 10:
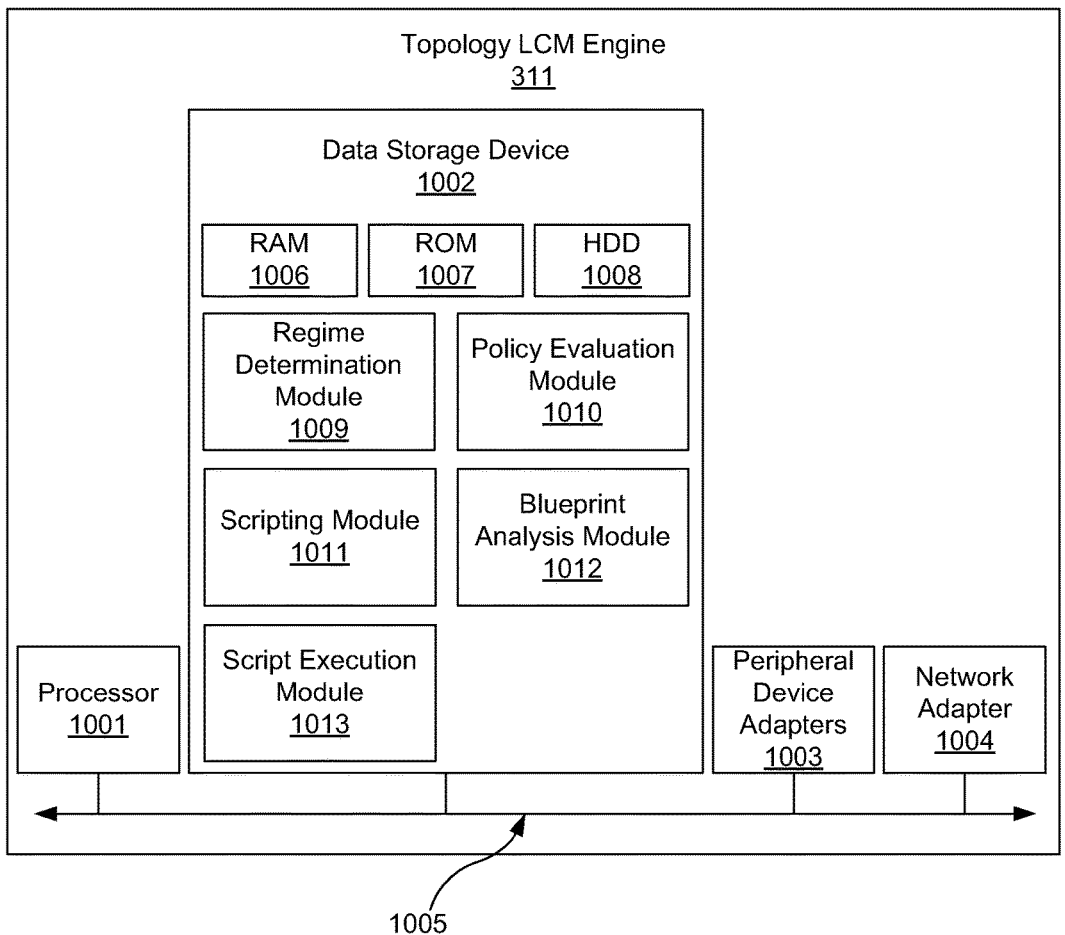
FIG. 10 is a block diagram of a topology lifecycle management engine for executing a number of lifecycle management topologies, according to one example of the principles described herein.

FIG. 10 is a block diagram of a topology lifecycle management engine (311) for executing a number of lifecycle management topologies (302), according to one example of the principles described herein. The topology LCM engine (311) may be implemented in an electronic device as a stand alone device or as an integrated device with a number of the other computing devices described herein. Examples of electronic devices include desktop computers, laptop computers, personal digital assistants (PDAs), mobile devices, smartphones, gaming systems, and tablets, among other electronic devices.

The topology LCM engine (311) may be utilized in any data processing scenario including, hardware, mobile application, a network, or combinations thereof. Further, the topology LCM engine (311) may be used in a computing network, a public cloud network, a private cloud network, a hybrid cloud network, other forms of networks, or combinations thereof. In one example, the methods provided by the topology LCM engine (311) are provided as a service over a network by, for example, a third party. In this example, the service may comprise, for example, the following: a Software as a Service (SaaS) hosting a number of applications; a Platform as a Service (PaaS) hosting a computing platform comprising, for example, operating systems, hardware, and storage, among others; an Infrastructure as a Service (IaaS) hosting equipment such as, for example, servers, storage components, network, and components, among others; application programming interface (API) as a service (APIaaS), other forms of network services, or combinations thereof. The present systems may be implemented on one or multiple hardware platforms, in which the modules in the system can be executed on one or across multiple platforms. Such modules can run on various forms of cloud technologies and hybrid cloud technologies or offered as a SaaS (Software as a service) that can be implemented on or off the cloud. In another example, the methods provided by the topology LCM engine (311) are executed by a local administrator.

To achieve its desired functionality, the topology LCM engine (311) comprises various hardware components. Among these hardware components may be a number of processors (1001), a number of data storage devices (1002), a number of peripheral device adapters (1003), and a number of network adapters (1004). These hardware components may be interconnected through the use of a number of busses and/or network connections. In one example, the processor (1001), data storage device (1002), peripheral device adapters (1003), and a network adapter (1004) may be communicatively coupled via a bus (1005).

The processor (1001) may include the hardware architecture to retrieve executable code from the data storage device (1002) and execute the executable code. The executable code may, when executed by the processor (1001), cause the processor (1001) to implement at least the functionality of topology and blueprint execution, and instantiation of cloud services therefrom, according to the methods of the present specification described herein. In the course of executing code, the processor (1001) may receive input from and provide output to a number of the remaining hardware units within the topology LCM engine (311), the topology-based management broker (100), or other internal or external computing devices.

The data storage device (1002) may store data such as executable program code that is executed by the processor (1001) or other processing device. As will be described in more detail below, the data storage device (1002) may specifically store a number of application modules that the processor (1001) executes to implement at least the functionality described herein.

The data storage device (1002) may include various types of memory modules, including volatile and nonvolatile memory. For example, the data storage device (1002) of the present example includes Random Access Memory (RAM) (1006), Read Only Memory (ROM) (1007), and Hard Disk Drive (HDD) memory (1008). Many other types of memory may also be utilized, and the present specification contemplates the use of many varying type(s) of memory in the data storage device (1002) as may suit a particular application of the principles described herein. In certain examples, different types of memory in the data storage device (1002) may be used for different data storage needs. For example, in certain examples the processor (1001) may boot from Read Only Memory (ROM) (1007), maintain nonvolatile storage in the Hard Disk Drive (HDD) memory (1008), and execute program code stored in Random Access Memory (RAM) (1006).

Generally, the data storage device (1002) may comprise a computer readable medium, a computer readable storage medium, or a non-transitory computer readable medium, among others. For example, the data storage device (1002) may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. In another example, a computer readable storage medium may be any non-transitory medium that can contain, or store a program for use by or in connection with an instruction execution system, apparatus, or device.

The peripheral device adapters (1003) in the topology LCM engine (311) enable the processor (1001) to interface with various other hardware elements, external and internal to the topology LCM engine (311). For example, peripheral device adapters (103) may provide an interface to input/output devices, such as, for example, a display device, a mouse, or a keyboard. The peripheral device adapters (103) may also provide access to other external devices such as a number of external storage devices. The display device may be provided to allow an individual to interact with and implement the functionality of the topology LCM engine (311). The peripheral device adapters (103) may also create an interface between the processor (1001) and a printer, the display device, or other media output device. The network adapter (1004) may provide an interface to other computing devices within, for example, a network, thereby enabling the transmission of data between the topology LCM engine (311) and other devices located within the network.

The topology LCM engine (311) further comprises a number of modules used in the execution and implementation of topologies and blueprints. The various modules within the topology LCM engine (311) may be executed separately. In this example, the various modules may be stored as separate computer program products. In another example, the various modules within the topology LCM engine (311) may be combined within a number of computer program products; each computer program product comprising a number of the modules.

The topology LCM engine (311) may include a regime determination module (1009) to, when executed by the processor (1001), determine whether a topology or blueprint is to be executed in connection with FIGS. 1-7, 9, 11, 12A, and 12B. As described above, in one example, a topology (302) may be designed de novo or via the stitching of applications models (319) to infrastructure templates (320) as described above. In this example, the topology (302) may be executed and instantiated as described above. In another example, the topology LCM engine (311) directly executes a blueprint (100). In still another example, the a topology may be derived from a blueprint (100) executed and instantiated as described herein.

The LCM engine (311) and the below described blueprint analysis engine (1012) co-exist by determining, via the regime determination module (1009), which content or data is associated with the blueprint regime, and which content or data is associated with the topology regime. The content or data associated with the blueprint engine may be directly executed by the script execution module (1013) or transformed into a topology and executed as a topology. Content or data associated with a topology or a blueprint-derived topology is executed by transforming the topology into executable logic like a blueprint, and executing the executable logic using the same engine. Thus, the present LCM engine (300) is capable of executing and instantiating both topologies and blueprints. This has the advantage of providing a system that can accommodate for all forms of cloud service instantiation.

Thus, in one example, a topology (302) may be designed using the stitching engine (121) to stitch a number of application models (119) to a number of infrastructure templates (120) as described above in connection with FIG. 9. In this example, the resulting topology (302) may comprise a number of nodes (302-1, 302-2, 302-3, 302-4, 302-5, 302-6, 302-7) as described above, and a number of policies (103) and LCMAs (104) are associated with the nodes (302-1, 302-2, 302-3, 302-4, 302-5, 302-6, 302-7). In still another example, the topology may be derived from a blueprint using, for example, the blueprint analysis module (1012) of the topology LCM engine (311). In still another example, a blueprint may be executed by the LCM engine (311) directly via the blueprint analysis module (1012) without first converting the blueprint into a topology (303).

Blueprints describe services in terms of the collections of workflows that are to be performed on all the components that make up the service in order to perform a particular lifecycle management action. Similarly, the topologies to be executed by the LCM engine may be converted into blueprint-like workflows that are to be executed to provision, instantiate and manage all the components that make up the service. During provisioning and instantiation of a topology, the LCMAs associated with a topology are performed as calls to a resource provider. The resource provider converts the calls into instructions specific to a particular resource offered by a resource provider. Similarly, each object in a blueprint may be associated with action workflows that call resource providers.

The topology LCM engine (311) may include a blueprint analysis module (1012) to, when executed by the processor (1001), convert a blueprint (100) to a topology (302) and execute the blueprint (100). As described above, the topology LCM engine (311) may process a blueprint to obtain a number of containment relationships for use in designing a topology. Further, a number of temporal dependency relationships may also be derived from the blueprint in order to design the topology (302). Still further, the topology LCM engine (311) may process the blueprint to obtain a number of additional relationships for use in designing a topology.

Further, the blueprint analysis module (1012) analyzes a blueprint (100) in anticipation for direct execution as described above. In this example, a blueprint (100) may be obtained and executed without first converting the blueprint into a topology (302). Blueprints are already expressed as an orchestration of serial and parallel scripts or executable logic. In this example, the blueprint's (100) collection of workflows are executed by calling resource providers to provision all the components that make up the service. In this manner, the LCM engine (311) is capable of executing a blueprint and instantiating a service directly from the blueprint (100).

Topologies, however, are executed by the LCM engine (311) differently. As will be described in more detail below, the execution and instantiation of topologies is performed by first transforming the topologies (302) into a number of serial and parallel scripts with the scripting module (1011). This transformation of a topology (302) into a series of scripts that are executed is equivalent to the manner in which a blueprint is expressed. Further, a topology's execution and instantiation is equivalent to a blueprint. Thus, the LCM engine (311) may execute a topology by additionally transforming the topology into a combination of serial and parallel scripts like those in a blueprint as will be described in more detail below. Thus, the LCM engine comprises the scripting module (1011) to add the transformation of the topology to a number of serial and parallel scripts in front of the LCM engine's instantiation processes.

Having described several sources of designed topologies including de novo designs, designs from a stitching method, and designs based on blueprints and the use of the regime determination module (1009) and the blueprint analysis module (1012), a method of executing lifecycle management topologies (302) using a number of sets of serial and parallel lifecycle management logics will now be described. The topology LCM engine (311) may include a policy evaluation module (1010) to, when executed by the processor (1001), identify and execute a number of the policies associated with a topology (302) to guide provisioning of a number of computing resources from a number of resource providers. As described above, policies (303) are a number of descriptions, metadata, workflows, scripts, rules, or sets of rules that are applicable to guiding the provisioning, monitoring, enforcement, governance, access control, usage, and remediation tasks associated with the lifecycle management of a number of nodes (302-1, 302-2, 302-3, 302-4, 302-5, 302-6, 302-7) within a cloud service environment in which the topology (302) is to be or has been implemented. The policies (303) may be associated with and operable against a number of individual nodes, a number of groups of nodes, a number of nodes of a class of nodes, a subset of the nodes within the entire topology of the cloud service; the entire topology of the cloud service as a whole, or combinations thereof. If the policies (303) are initiated, the policies will guide how life cycle management actions LCMAs (304) are taken with respect to, or performed on the individual nodes, groups of nodes, nodes of a class of nodes, a subset of the nodes within the entire topology of the cloud service, or the entire topology of the cloud service as a whole.

The topology LCM engine (311) may further include the above-described scripting module (1011) to, when executed by the processor (1001), derive a number of serial and parallel scripts from the topology (302) or blueprint (100) for execution by the LCM engine (311). Scripts are a series of commands or executable logic, combined in a file, which carry out a number of functions when the file is executed. Scripts are interpreted as they are executed. All scripts can be executed serially during the instantiation of a topology (302) or blueprint (100), However, some scripts derived from the topologies (302) and blueprints (100) may be executed in parallel due to the non-dependent nature of the to-be-provisioned computing resources. In this manner, parallelization of scripts where possible speeds up the execution and instantiation of the topologies (302) and blueprints (100).

A number of scripts may be derived by the scripting module (1011) for execution. The scripts define executable logic for instantiating a cloud service based on a topology (FIGS. 1A and 1B, 302), a topology (FIGS. 1A and 1B, 302) created from a blueprint (100), or a blueprint, and any policies (FIG. 1A, 103), and the LCMAs (FIG. 1A, 104) associated therewith. Thus, the topology LCM engine (311) may further include the script execution module (1013) to, when executed by the processor (1001), execute the serial and parallel scripts from the topology (302) or blueprint (100) to create an instantiated service (FIG. 3A, 312). The topology LCM engine (FIG. 1A, 311) instantiates (block 809) the topology (FIGS. 1A and 1B, 302) based on the policies (FIG. 1A, 103), and LCMAs (FIG. 1A, 104). Having described the various elements of the topology LCM engine (311) the execution and instantiation of a number of scripts based on the topologies (302) or blueprints (100) will now be described in more detail.

Figure 11:
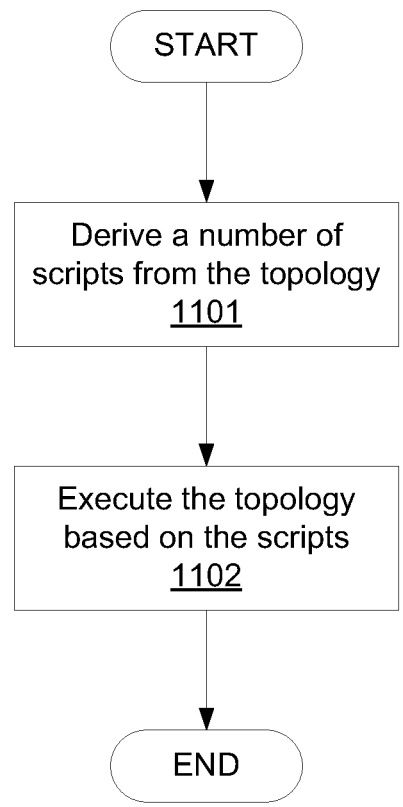
FIG. 11 is a flowchart showing a method of executing a topology, according to one example of the principles described herein.

FIG. 11 is a flowchart showing a method of executing a topology (302), according to one example of the principles described herein. The method of FIG. 11 may begin by deriving (block 1101) a number of scripts from a topology (302). The scripting module (1011) derives the scripts from the topology (302). The method of FIG. 11 may continue by executing (block 1102) the topology (302) based on the scripts derived by the scripting module (1011). The execution (block 1102) of the topology (302) may be performed by the, with the script execution module (1013), More details regarding the execution and instantiation of the topologies (302) will now be described in connection with FIGS. 12A and 12B. In one example, the scripting module (1011) derives the scripts from a graph of the topology (302) by executing a walking algorithm. In this example, the walking algorithm is guided by relationships between nodes within the graph to extract information regarding how the topology (302) is to be executed. The information provided through the walking of the topology (302) forms the execution plan described herein.

Figure 12A:
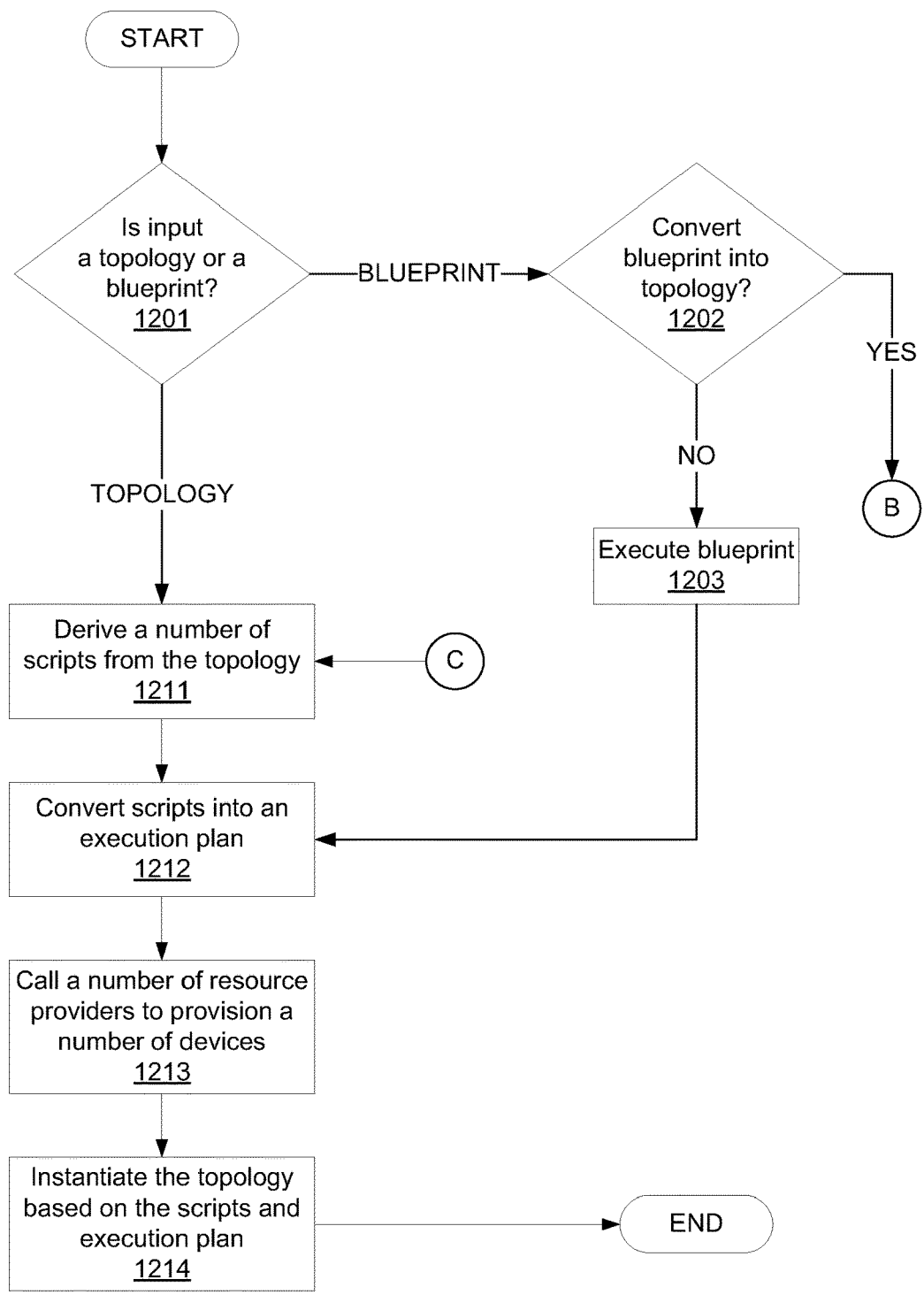
FIGS. 12A and 12B are flowcharts showing a method of executing a topology, according to another example of the principles described herein.
Figure 12B:
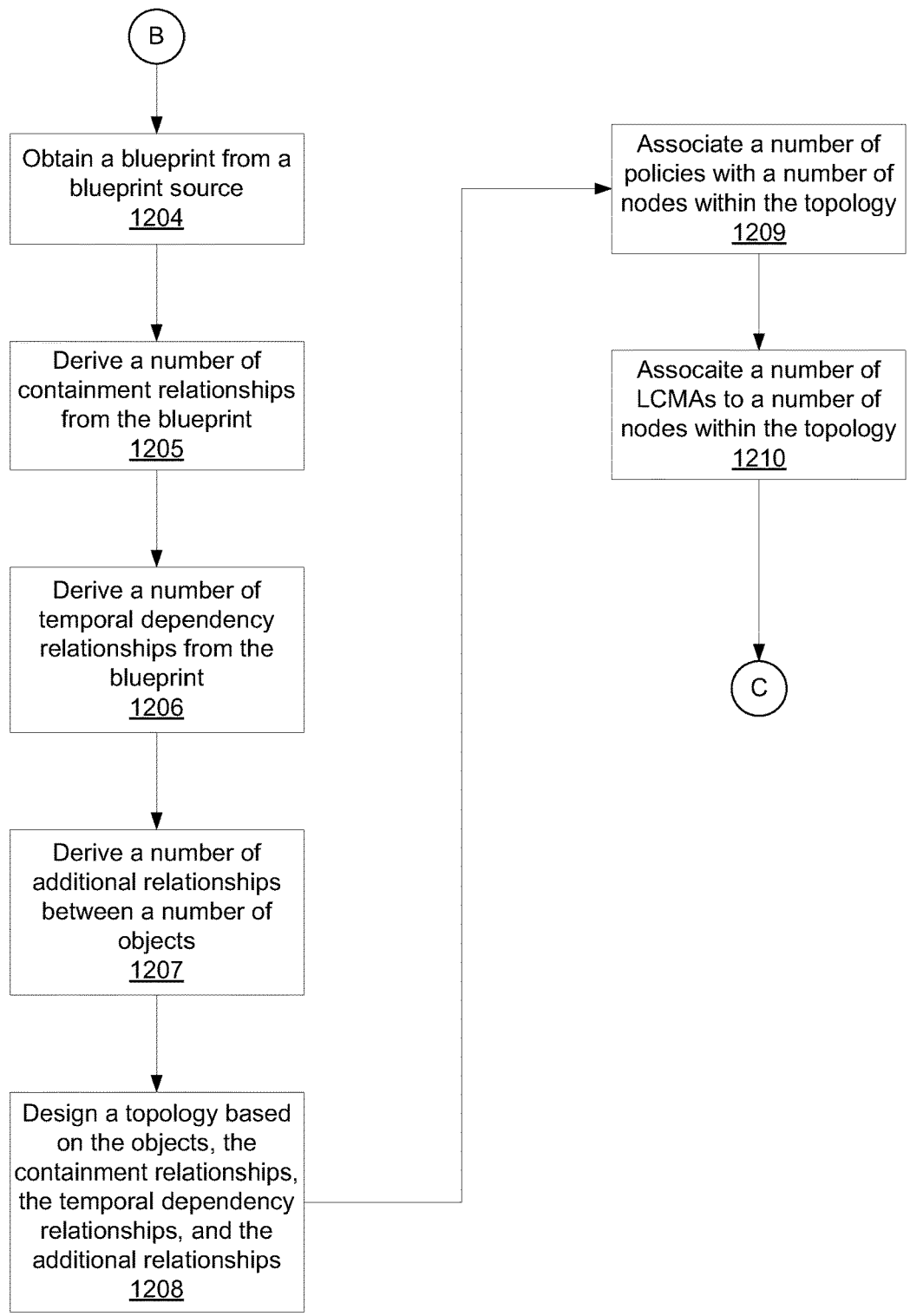

FIGS. 12A and 12B are flowcharts showing a method of executing a topology (302), according to another example of the principles described herein. The method of FIGS. 12A and 12B may begin by determining (block 1201) if the input to the LCM engine (311) is a blueprint or a topology. The LCM engine (311) and the blueprint analysis module (1012) co-exist by the LCM engine (311) determining, with the regime determination module (1009), which content or data is associated with the blueprint regime, and which content or data is associated with the topology regime. If the input is a blueprint (100) (block 1201, determination BLUEPRINT), then it may be determined (block 1202) if the blueprint is to be converted into a topology. If the blueprint is not to be converted into a topology (block 1202, determination NO), then the blueprint (100) is executed (block 1203). Content or data associated with the blueprint regime is directly executed by the blueprint analysis module (1012) of the LCM engine (311). The execution of the blueprint may be described in connection with both FIGS. 5 and 12A. Thus, execution of a blueprint includes inputting the blueprint (100), with its workflows or scripts, to the interpreter (FIG. 4, 403) for processing. The interpreter interprets the provisioning policies to create (block 1212) an execution plan as indicted by arrow 408 of FIG. 4. The result is then interpreted and converted into an execution plan (408) that comprises a number of workflows or a sequence of serial and/or parallel scripts. The topology LCM engine (311) obtains the workflows or sequence of serial and/or parallel scripts, calls (block 1213) a resource provider via the resource offering manager (308) as indicated by arrow 409, and creates (block 1214) an instantiated service (312) at block 405 of FIG. 4.

If, however, the blueprint is to be converted into a topology (block 1202, determination YES), then conversion of the blueprint (100) into a topology (302) may proceed by following element B to FIG. 12B. The method of FIGS. 2A and 2B may proceed by obtaining (1204) a blueprint (100) from a blueprint source. A blueprint (100) may be obtained from a number of sources including, for example, a user, an administrator, a consumer, or a third party program, among other sources of blueprints. At block 1205, the blueprint analysis module (1012), topology designer (301), or other device derives a number of containment relationships from the blueprint (100), the containment relationships defining a number of hierarchical relationships between a number of objects within the blueprint. In one example, the containment relationships are explicit parameters of the blueprint. In another example, the containment relationships are characteristics of the blueprint. In this example, a device such as, for example, the blueprint analysis module (1012) or the topology designer (301), derives the containment relationships from the blueprints using logic of the topology designer (301).

At block 1206, the blueprint analysis module (1012), topology designer (301), or other device derives a number of temporal dependency relationships from the blueprint, the temporal dependency relationships defining a number of provisioning relationships between objects within the blueprint (100). In one example, the temporal dependency relationships are explicit parameters of the blueprint (100). In another example, the temporal dependency relationships are characteristics of the blueprint (100). In this example, a device such as, for example, the blueprint analysis module (1012) or the topology designer (301), derives the temporal dependency relationships from the blueprints (100) using logic of the topology designer (301).

A number of additional relationships between a number of the objects within the blueprints (100) may also be derived (block 1207) using the blueprint analysis module (1012), topology designer (301), or other device. A number of parameters can also be derived by the topology designer (301) from a number of the containment relationships, a number of the temporal dependency relationships, a number of objects, or combinations thereof. In one example, the parameters may be expressed as these additional relationships between a number of the objects within the blueprints (100). Knowing of these additional relationships assists the topology designer (301) in creating a topology that appropriately fits an intended use and will work with a number of applications intended to run on an instantiated service (112) derived from the topology (302).

The method of FIGS. 12A and 12B may continue by designing (block 1208) a topology based on a number of the objects within the blueprint (100), a number of the containment relationships, a number of the temporal dependency relationships, a number of the additional relationships, or combinations thereof. In one example, the topology designer (301) is the device that designs the topology. Further, any format may be used to describe topologies (302) derived from blueprints (1000). In one example, TOSCA may be used to describe topologies (302) derived from the blueprints (100).

The method of FIGS. 12A and 12B may continue by associating (block 1209) a number of policies (FIG. 1A, 103) with a number of nodes within the topology (102) formed from the blueprint (100). In one example, a number of provisioning policies are associated with the topology. In this example, the provisioning policies are associated with the present blueprint-derived topology. In another example, the provisioning policies may be associated with the nodes for a topology derived de novo or via an application model and infrastructure template stitching method as described above in connection with FIGS. 3A, 3B, 5-7, and 9.

At block 1210, a number of LCMAs may be associated with a number of nodes within the topology (302) formed from the blueprint (100). The association of the policies (303) and LCMAs (304) with the topology (302) may be performed as described above. In this manner, even though a number of policies and LCMAs may be derived from the blueprint (100) by way of derivation of the containment relationships, the temporal dependency relationships, and the additional relationships from the blueprint (100), a number of additional policies and LCMAs may be added to the topology (302) in order to create a topology (302) that, when instantiated, will perform as desired or expected. In this manner, a blueprint is converted into a topology, and the method returns via element C to FIG. 12A.

Turning again to block 1201, if the input is a topology (302) (block 1201, determination TOPOLOGY), or if a blueprint (100) is converted into a topology via blocks 1202 through 1210, the execution of the topology may be described in connection with both FIGS. 5 and 12A. Thus a number of scripts are derived (block 1211) from the topology. This may be performed by sending the resulting topology to the interpreter (403). As described above, the interpreter (403) interprets the provisioning policies to create an execution plan as indicted by arrow 408. The result of the derivation (block 1211) of the scripts from the topology is then interpreted and converted (block 1212) into an execution plan (408) that comprises a workflow or sequence of serial and/or parallel scripts. In one example, the policy evaluation module (1010) indentifies a number of policies within the topology (302) or blueprint-derived topology that impact the derived scripts and the execution of those scripts. In this example, The topology LCM engine (311) obtains the workflows or sequences of serial and/or parallel scripts, and calls (block 1213) a number of resource providers via the resource offering manager (308) as indicated by arrow 409 of FIG. 4 to provision a number of devices. The LCM engine (311) instantiates (block 1214) a cloud service (312) based on the scripts and execution plan as similarly described above in connection with block 405 of FIG. 4.

Assuming the workflow or sequence of serial and/or parallel scripts is executable, the actions associated with the workflow or sequence of serial and/or parallel scripts are executed by the LCM engine (311). For example, if a node (302-1, 302-2, 302-3, 302-4, 302-5, 302-6, 302-7) is required to be provisioned before another node (302-1, 302-2, 302-3, 302-4, 302-5, 302-6, 302-7), the topology may not be realizable if the serial or parallel scripts did not account for this prerequisite provisioning. In this example, an exception is raised and an error is returned and/or logged. Further, in one example, parallel scripts may be used in situations were no order relationships between nodes are implied.

With the above-described sequence based topology, an execution plan (408) may be represented as a blueprint. Conversely, a blueprint may be expressed as an execution plan (408). A blueprint with nodes expanded by policies (303) and LCMAs (304) may be similarly processed, instead, in a manner similar to the processing of a topology. In this example, the blueprint in the form of a sequential service design (406) is input to the interpreter for processing as described above in connection with FIG. 4. Thus, the content or data associated with a topology will be executed by transforming it into scripts similar to a blueprint (100) and executing the scripts in the LCM engine (311) as is the blueprints themselves.

The execution of the execution plan (408) by the topology life cycle management engine (311) results in an instantiation (block 1214) of the cloud services including the provisioning of devices for monitoring, event handling, and processing and remediation of events and incidents as described herein. The result of the topology life cycle management engine (311) executing the workflow or sequence of serial and/or parallel scripts as defined by the execution plan (408) is an instantiated service (312) as indicated by block 405 of FIG. 4. Further, a realized topology (314) may be created based on the instantiated service (312).

As described above, FIG. 5 is a block diagram of an execution flow of the execution of a realized topology using provisioning policies, according to one example of the principles described herein. In this example, the application may be described as a realized topology, after which the application is self-managing. As depicted in FIG. 5, a realized topology (511) or other desired or target realized topology (512) may be input into a realized topology engine (513). The realized topology engine (513) may be a stand alone device or incorporated into a device of FIGS. 3A and/or 3B. Similarly, as depicted in FIG. 5, the realized topology (and corresponding topology changes received from the LCM engine (311)) may be an input into a provisioning policy engine (502). The policy provisioning engine (502) may obtain a number of provisioning policies from a resource provider called resource provider policies (PR) (308-1), a number of provisioning policies as defined by a user, a number of policies as defined by the topology designer (301), or combinations thereof.

Resource provider policies (308-1) may be any policies that are associated with a number of resource providers' offerings that guide the selection of a number of resources. In one example, the resource provider policies (308-1) may be dynamic functions that define the computing abilities of a computing resource. In this example, a computing resource that provides a defined level of computing resources such as, for example, processing power may be provisioned by the LCM engine (311) and resource offering manager (308) if the defined level of that computing resource meets a number of requirements within the topology (302).

In some examples, a realized topology is modified at the time of provisioning. This may be performed by executing, with the provisioning policy engine (502) or the resource offering manager (308), the provisioning policies to determine a topology that satisfies the provisioning policies perfectly or in the best obtainable manner. Obtaining a best fit topology may involve a number of resource provider policies (308-1) provided by the resource offering manager (308) which describe the capabilities and selection criteria of a resource provider. The resource offering manager (308) selects, for example, the resource provider from which the resource is to be obtained, and may also make other modifications to the topology (302).

The topology (302) is modified per the received provisioning policies (308-1) by the provisioning policy engine (502) as indicated by arrow 507, and sent to an interpreter (503). The interpreter (503) is any hardware device or a combination of hardware and software that interprets the provisioning policies to create an execution plan as indicted by arrow 508. In some examples, the execution plan (508) may include an indication as to whether the application is self-managing or auto-managing. For example, the execution plan (508) may include code within the application that carries out provisioning, remediation, event handling, or combinations thereof. Alternatively, the execution plan (508) may provision, remediate, handle events, or combinations thereof based on policies.

The result is then interpreted and converted into an execution plan (508) that comprises a workflow or sequence of serial and/or parallel scripts in order to create an instance of the topology (FIG. 1A, 312). In one example, the interpreter (503) is a stand alone device or is contained within the LCM engine (FIG. 1A, 311). The execution plan (508) comprises a number of workflows or sequences of serial and/or parallel scripts. In some examples, the execution plan (508) may modify, retire or instantiate a new instance.

The execution of the execution plan (508) by the topology life cycle management engine (311) results in an instantiation of the cloud services including the provisioning of devices for monitoring, event handling, and processing and remediation of events and incidents as will be described in more detail below. The topology LCM engine (311) may update a realized topology with policies and LCMAs as indicated by the arrow (514), which may be passed to the realized topology engine (513) to update a realized topology based on the policies and updates Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the a number of processors within the devices comprising the topology-based management broker (200) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describe methods and systems of managing the lifecycle of cloud service modeled as a topology. These systems and methods include, with a processor, generating a topology, the topology representing a cloud service, associating a number of lifecycle management actions (LCMAs) with a number of nodes within the topology, and with a lifecycle management engine, executing the topology.

This management of the lifecycle of a cloud service modeled as a topology may have a number of advantages, including: (1) providing a common stack along with common use of topologies, realized topologies, and policies may be used to support all use cases for both cloud service automation (CSA) and continued delivery automation (CDA) platforms and services to construct topologies while utilizing the same technology and supporting multiple providers' associated technologies; (2) providing a computing environment in which CSA and CDA use the same topology representations such as, for example, extensible mark-up language (XML) or JavaScript object mutation (JSON); (3) providing a method of managing migration of content for CSA by reusing existing CSA content, creating a path to migrate resource providers, and reusing providers; (4) avoiding or alleviating the risk of perpetuating a CSA/CDA confusion, duplication of efforts and endangering future CSA opportunities; (5) complex applications may be automatically deployed on requested infrastructure without also requiring users to understand how to perform such operations, and (6) supports a CM&S environment, among many other advantages.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method executed by a system comprising a processor, comprising:
    associating a monitoring policy and a provisioning policy with respective nodes of a topology, the nodes of the topology representing respective resources for implementing a service;
    associating a blueprint with service workflows to be executed and managed, wherein the blueprint is a collection of workflows to be executed;
    deriving executable logic based on the topology, the monitoring policy, and the provisioning policy, wherein the topology and the blueprint are supported by a same management engine and the blueprint is executed by the management engine to produce an instantiated service independent of the topology;
    identifying non-dependent relationships among objects of the blueprint;
    executing the executable logic that causes instantiating of the service to produce an instantiated service using a resource specified by the provisioning policy, wherein the executable logic with non-dependent relationships are executed in parallel; and
    monitoring the instantiated service for an event according to the monitoring policy.

2. The method of claim 1, wherein deriving the executable logic based on the topology comprises walking the topology based on relationships between the nodes of the topology, and wherein walking the topology creates an execution plan.

3. The method of claim 1, further comprising:
    associating a remediation policy with the topology, wherein the executable logic is derived further based on the remediation policy; and
    in response to the monitoring identifying an incident, causing implementation of a remediation action according to the remediation policy to address the incident.

4. The method of claim 3, wherein causing the implementation of the remediation action to address the incident comprises modifying the topology.

5. The method of claim 1, wherein the executable logic comprises a script produced by an interpreter using the monitoring policy and the provisioning policy.

6. The method of claim of claim 1, wherein the topology is a realized topology.

7. The method of claim 1, wherein deriving the executable logic comprises:
    identifying dependent relationships among the objects of the blueprint, the dependent relationships defining serial executions among dependently related nodes of the topology;
    identifying non-dependent relationships among the objects of the blueprint, the non-dependent relationships defining parallel executions among non-dependently related nodes of the topology; and
    designing the blueprint based on the objects of the blueprint, the dependent relationships and the non-dependent relationships.

8. The method of claim 1, further comprising associating lifecycle management actions (LCMAs) with a number of the nodes of the topology, the LCMAs comprising a first LCMA triggered by the monitoring policy, and a second LCMA triggered by the provisioning policy.

9. The method of claim 8, further comprising:
    performing the LCMAs including the first LCMA during execution of the instantiated service.

10. The method of claim 1, further comprising executing, by a lifecycle management engine, a number of blueprints, the number of blueprints comprising the executable logic.

11. The method of claim 1, wherein executing the executable logic comprises:
    converting the executable logic into an execution plan;
    calling a number of resources providers to provision a number of devices; and
    instantiating the service based on the execution plan.

12. A system comprising:
    a processor; and
    a non-transitory storage medium comprising instructions executable on the processor to:
        determine whether a blueprint is to be executed, wherein the blueprint is executed to produce an instantiated service and is independent of a topology;
        associate actions with a first and second node within the topology;
        associate a monitoring policy with the first node of the topology, and associate a remediation policy with the second node of the topology;
        derive executable logic based on the topology, the monitoring policy, and the remediation policy;
        identify non-dependent relationships among objects of the blueprint;
        execute the executable logic to cause instantiating of the service to produce an instantiated service, wherein the executable logic with non-dependent relationships are executed in parallel;
        monitor a first resource of the instantiated service during execution for an event according to the monitoring policy, the first resource represented by the first node; and
        in response to the monitoring identifying an incident, cause implementation of a remediation action with respect to a second resource according to the remediation policy to address the incident, the second resource represented by the second node.

13. The system of claim 12, wherein deriving the executable logic comprises deriving a script using an interpreter that receives as inputs policies including the monitoring policy and the remediation policy.

14. The system of claim 12, wherein causing the implementation of the remediation action to address the incident comprises modifying the topology.

15. A non-transitory computer readable storage medium comprising computer usable program code that upon execution causes a system to:
associate policies with nodes of a topology, the policies comprising a remediation policy associated with an individual node of the nodes;
associate a blueprint with service workflows to be executed and managed, wherein the blueprint is a collection of workflows to be executed and wherein the topology and the blueprint are supported by a same management engine and the blueprint is executed by the management engine to produce an instantiated service independent of the topology;
derive executable logic from the topology and the policies;
identify non-dependent relationships among objects of the blueprint execute the topology based on the executable logic to instantiate a cloud service, wherein the executable logic with non-dependent relationships are executed in parallel; and
perform a remediation action with respect to a resource of the instantiated cloud service according to the remediation policy to address an incident detected during execution of the instantiated cloud service, the resource represented by the individual node.

16. The non-transitory computer readable storage medium of claim 15, wherein the policies further comprise a monitoring policy, and the executable logic is derived further based on the monitoring policy, and wherein the computer usable program code upon execution causes the system to:
detect the incident according to the monitoring policy during the execution of the instantiated cloud service.

17. The non-transitory computer readable storage medium of claim 15, wherein the policies further comprise a provisioning policy, and the executable logic is derived further based on the monitoring policy, and wherein the instantiating of the cloud service uses a resource specified by the provisioning policy.

18. The non-transitory computer readable storage medium of claim 15, wherein performing the remediation action to address the incident comprises modifying the topology.

19. The non-transitory computer readable storage medium of claim 15, wherein the computer usable program code upon execution causes the system to:
associate a lifecycle management action with a node of the topology; and
perform the lifecycle management action during execution of the instantiated cloud service.

20. The non-transitory computer readable storage medium of claim 15, wherein deriving the executable logic comprises deriving a script by an interpreter that receives as inputs the policies.

* * * * *